United States Patent
Shiraishi

(10) Patent No.: US 6,975,691 B1
(45) Date of Patent: Dec. 13, 2005

(54) RECEIVER

(75) Inventor: Kenichi Shiraishi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/554,695

(22) PCT Filed: Dec. 17, 1998

(86) PCT No.: PCT/JP98/05721

§ 371 (c)(1),
(2), (4) Date: May 18, 2000

(87) PCT Pub. No.: WO99/31851

PCT Pub. Date: Jun. 24, 1999

(30) Foreign Application Priority Data

Dec. 17, 1997 (JP) ............................................. 9/364606

(51) Int. Cl.[7] ............................................. H04L 27/22
(52) U.S. Cl. ..................................... 375/329; 375/326
(58) Field of Search ................................. 375/326, 327, 375/339, 344, 345, 364, 375, 324, 316, 329, 340; 455/136, 139, 164.1, 164.2, 182.2, 251, 252, 258; 329/304, 306, 308, 346

(56) References Cited

U.S. PATENT DOCUMENTS

| | | | | |
|---|---|---|---|---|
| 4,893,316 A | * | 1/1990 | Janc et al. .................... | 708/300 |
| 5,311,545 A | * | 5/1994 | Critchlow .................... | 375/232 |
| 5,440,587 A | * | 8/1995 | Ishikawa et al. ............. | 375/332 |
| 5,493,710 A | * | 2/1996 | Takahara et al. .......... | 455/192.2 |
| 5,579,345 A | * | 11/1996 | Kroeger et al. .............. | 375/344 |
| 5,604,768 A | * | 2/1997 | Fulton ......................... | 375/220 |
| 5,656,971 A | * | 8/1997 | Gotoh ......................... | 329/308 |
| 5,832,043 A | * | 11/1998 | Eory ........................... | 375/344 |
| 5,881,099 A | * | 3/1999 | Takahashi et al. ........... | 375/141 |
| 5,883,921 A | * | 3/1999 | Andren et al. ............... | 375/150 |
| 5,960,040 A | * | 9/1999 | Cai et al. ..................... | 375/279 |
| 6,023,491 A | * | 2/2000 | Saka et al. ................... | 375/326 |
| 6,034,564 A | * | 3/2000 | Iwamatsu .................... | 329/306 |
| 6,144,860 A | * | 11/2000 | Komatsu ..................... | 455/522 |
| 6,310,863 B1 | * | 10/2001 | Yamamoto ................... | 370/281 |
| 6,334,203 B1 | * | 12/2001 | Inagawa ...................... | 714/798 |

FOREIGN PATENT DOCUMENTS

| | | |
|---|---|---|
| JP | 9-186730 | 7/1997 |
| JP | 9-321813 | 12/1997 |
| JP | 10-215291 | 8/1998 |
| JP | 11-46224 | 2/1999 |

OTHER PUBLICATIONS

International Preliminary Examination Report, dated Aug. 24, 2000.

* cited by examiner

Primary Examiner—Emmanuel Bayard
(74) Attorney, Agent, or Firm—Eric J. Robinson; Robinson Intellectual Property Law Office, P.C.

(57) ABSTRACT

When reception of multiplexed PSK modulated waves BPSK and 8PSK starts, a selector (16C) of a demodulation circuit (IC) read higher-order three bits ΔΦ(3) of the phase error data corresponding to outputs I' and Q' of a remapper (7) for performing absolute phasing from a phase error table for BPSK out of tables provided for respective types of modulation methods. A reception signal phase rotation angle detection circuit (8C) detects the phase rotation angle corresponding to a bit "1" of a frame sync signal of a received symbol stream from ΔΦ(3) and the MSB of the output I' of the remapper (7) and outputs the phase rotation angle to the remapper (7) to allow the remapper (7) to perform absolute phasing. The selector (16C) reads phase error data corresponding to the received symbol data after absolute phasing output from the remapper (7) from the phase error table corresponding to the modulating method identified by a transmission configuration identification circuit (9), outputs the phase error data to a D/A converter (17), corrects the phase of carrier waves for orthogonal detection, and causes the difference in phase between the received signal point and the transmission signal point to be constant.

2 Claims, 26 Drawing Sheets

| θ | R | R (3) |
|---|---|---|
| 0 | 0 | 0 0 0 |
| π/4 | 1 | 0 0 1 |
| 2π/4 | 2 | 0 1 0 |
| 3π/4 | 3 | 0 1 1 |
| 4π/4 | 4 | 1 0 0 |
| 5π/4 | 5 | 1 0 1 |
| 6π/4 | 6 | 1 1 0 |
| 7π/4 | 7 | 1 1 1 |

FIG. 4A

| INPUT | OUTPUT |
|-------|--------|
| 0 0 0 | 0 0 0 |
| 0 0 1 | 0 0 1 |
| 0 1 0 | 0 1 1 |
| 0 1 1 | 0 1 0 |
| 1 0 0 | 1 1 0 |
| 1 0 1 | 1 1 1 |
| 1 1 0 | 1 0 1 |
| 1 1 1 | 1 0 0 |

FIG. 4B

| INPUT | OUTPUT |
|-------|--------|
| 0 0 0 | 0 0 0 |
| 0 0 1 | 0 0 1 |
| 0 1 1 | 0 1 0 |
| 0 1 0 | 0 1 1 |
| 1 1 0 | 1 0 0 |
| 1 1 1 | 1 0 1 |
| 1 0 1 | 1 1 0 |
| 1 0 0 | 1 1 1 |

FIG. 6

| INPUT (q (1) i (1)) | OUTPUT |
|---|---|
| 0 0 | 0 0 |
| 0 1 | 0 1 |
| 1 1 | 1 0 |
| 1 0 | 1 1 |

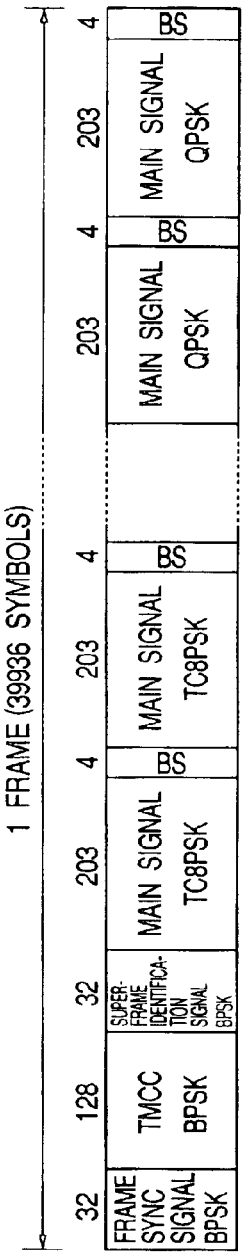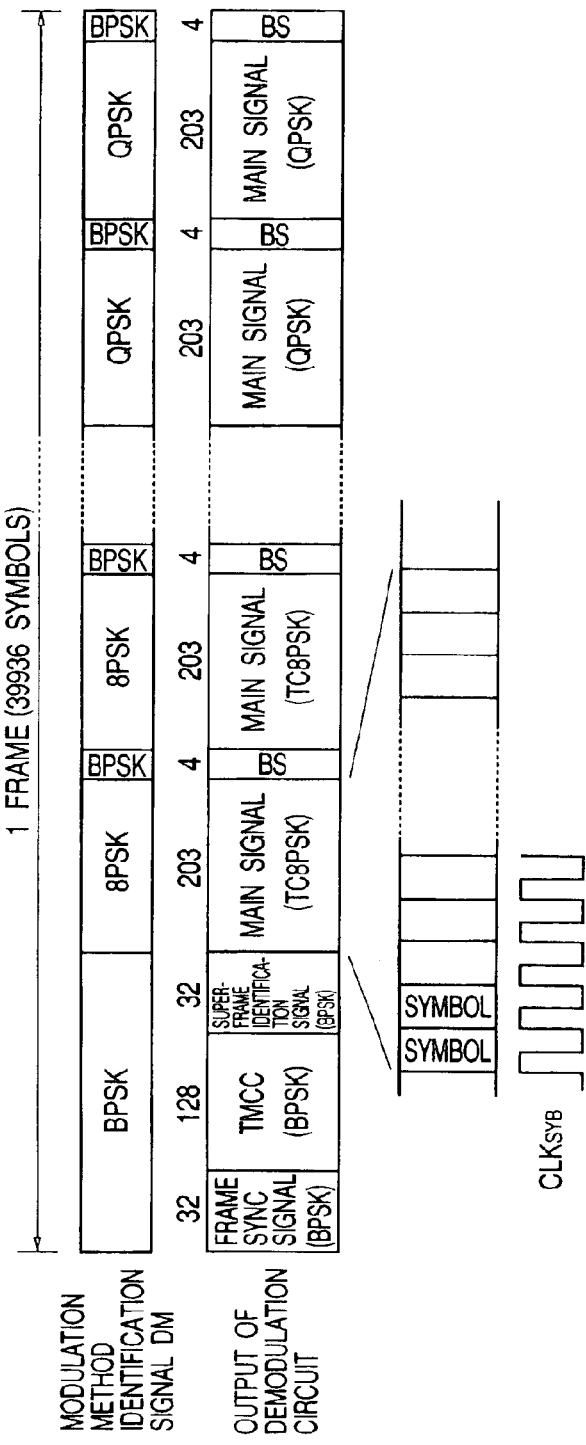

BPSK JUDGEMENT BORDER LINE

BPSK JUDGEMENT BORDER LINE

RECEIVER

TECHNICAL FIELD

The present invention relates to a receiver for receiving PSK modulated signals of digital signals which are modulated by a plurality of PSK modulation methods having different phase numbers such as two and eight phases, two and four phases, four and eight phases, or two and four and eight phases, particularly by hierarchical transmission methods, and which are multiplexed in time, and for demodulating the PSK modulated signals by using carriers reproduced by a carrier reproduction unit to output I and Q symbol stream data.

BACKGROUND ART

Digital satellite TV broadcasting by a hierarchical transmission method is being developed toward practical use in which digital waves modulated by a plurality of modulation methods having different necessary C/N values, such as 8PSK modulated waves, QPSK modulated waves, and BPSK modulated waves, are multiplexed in time and repetitively transmitted one frame after another.

FIG. 9A is a diagram showing an example of the frame structure used by the hierarchical transmission system. One frame is constituted of: a BPSK modulated frame sync pattern (BPSK) of 32 symbols (of 32 symbols, the last 20 symbols are actually used as the frame sync signal); a BPSK modulated transmission and multiplexing configuration control pattern (TMCC) of 128 symbols for transmission multiplexing configuration identification; a super-frame identification information pattern of 32 symbols (of 32 symbols, the last 20 symbols are actually used as the super-frame identification signal); an 8PSK modulated (trellis codec 8PSK) main signal (TC8PSK) of 203 symbols; a burst symbol signal (BS) of 4 symbols which is a BPSK modulated pseudo random noise (PN) signal; an 8PSK modulated (trellis codec 8PSK) main signal of 203 symbols; a burst symbol signal (BS) of 4 symbols which is a BPSK modulated pseudo random noise (PN) signal; . . . ; a QPSK modulated main signal of 203 symbols; a burst symbol signal (BS) of 4 symbols which is a BPSK modulated pseudo random noise (PN) signal; a QPSK modulated main signal of 203 symbols; and a BPSK modulated burst symbol signal (BS) of 4 symbols, in this order.

In a receiver for receiving a digital modulated wave (PSK modulated wave) of the hierarchical transmission method, an intermediate frequency signal of a reception signal received by a receiver circuit is demodulated by a demodulation circuit to obtain I and Q baseband signals (hereinafter, the I and Q baseband signals are described also as I and Q symbol stream data) of two series representative of instantaneous values of symbols, of orthogonal land Q-axes. A frame sync signal is captured from the demodulated I and Q baseband signals. A current reception signal phase rotation angle is calculated from the signal point arrangement of the captured frame sync signal. In accordance with the calculated reception signal phase rotation angle, the demodulated I and Q baseband signals are rotated in the inverse phase direction to make the reception signal phase angle be coincident with the transmission signal phase angle. This absolute phasing is realized by an absolute phasing circuit.

As shown in FIG. 10, the absolute phasing circuit of a receiver for receiving a PSK modulated wave of a conventional hierarchical transmission method, is constituted of: a frame sync detection/reproduction circuit 2 which functions as a frame sync signal capturing means provided on the output side of a demodulation circuit 1 in order to capture a frame sync signal; a remapper 7 made of a ROM which functions as an inverse phase rotating means; and a reception signal phase rotation angle detection circuit 8 which functions as a reception signal phase rotating angle detecting means. A transmission configuration identification circuit identifies the transmission multiplex configuration shown in FIG. 9A and outputs a modulation method identification signal DM of two bits.

The demodulation circuit 1 orthogonally detects the intermediate frequency signal to obtain I and Q baseband signals.

In the demodulation circuit 1, a carrier reproduction circuit 10 reproduces two orthogonal reference carriers $f_{c1}$ (=cos ωt) and $f_{c2}$ (=sin ωt) shifted by 90° in phase and synchronized with the frequency and phase of the received carrier. Multipliers 60 and 61 multiply the intermediate frequency signal 1F and $f_{c1}$ and $f_{c2}$. A/D converters 62 and 63 A/D convert the outputs of the multipliers 60 and 61 at a sample rate two times faster than the symbol rate. Digital filters 64 and 65 limit the band widths of the outputs of the A/D converters 62 and 63 by using digital signal processing. Thinning circuits 66 and 67 thin the outputs of the digital filers 64 and 65 at a half of the sampling rate of the A/D converters 62 and 63 to output I and Q baseband signals (I and Q symbol stream data) of two series representative of instantaneous values of symbols of the I- and Q-axes. The thinning circuits 66 and 67 output I and Q baseband signals I(8) and Q(8) of eight bits (2's complement) of quantization. The numerals in the parentheses of I(8) and Q(8) indicate the number of quantization bits, and I(8) and Q(8) may also be described simply as I and Q.

Mapping for each modulation method on the transmission side will be described with reference to FIGS. 11A–11C. FIG. 11A shows the signal point arrangement of the 8PSK modulation method on an l-Q phase plane (also called an I-Q vector plane or an I-Q signal space diagram). The 8PSK modulation method can transmit a digital signal (abc) of three bits by one symbol. There are eight combinations of bits constituting one symbol: (000), (001), (010), (011), (100), (101), (110), and (11). A digital signal of three bits is converted into signal points "0" to "7" on the transmission side I-Q phase plane as shown in FIG. 11A.

In the example shown in FIG. 11A, the bit train (000) is converted into the signal point "0", the bit train (001) is converted into the signal point "1", the bit train (011) is converted into the signal point "2", the bit train (010) is converted into the signal point "3", the bit train (100) is converted into the signal point "4", the bit train (101) is converted into the signal point "5", the bit train (111) is converted into the signal point "6", and the bit train (110) is converted into the signal point "7".

FIG. 11B shows the signal point arrangement of the QPSK modulation method on an I-Q phase plane. The QPSK modulation method can transmit a digital signal (de) of two bits by one symbol. There are four combinations of bits constituting one symbol: (00), (01), (10), and (11). In the example shown in FIG. 11B, the bit train (00) is converted into the signal point "0", the bit train (01) is converted into the signal point "3", the bit train (11) is converted into the signal point "5", and the bit train (10) is converted into the signal point "7".

FIG. 11C shows the signal point arrangement of the BPSK modulation method on an I-Q phase plane. The BPSK modulation method transmits a digital signal (f) of one bit by one symbol. For example, the bit (0) of the digital signal (f)

is converted into the signal point "0" and the bit (1) is converted into the signal point "4". The relation between the signal point arrangement and its point number of each modulation method is the same by using the relation of 8PSK as a reference.

The I- and Q-axes of QPSK and BPSK of the hierarchical transmission method are coincident with those of 8PSK.

If the phase of the reception carrier is coincident with the phase of the reference carriers $f_{c1}$ and $f_{c2}$ reproduced by the carrier reproduction circuit 10, the phase of the received signal point on the I-Q phase plane determined by the I and Q baseband signals I(8) and Q(8) is coincident with that on the transmission side, when the digital signal referenced to the signal point arrangement of "0" to "7" on the I-Q phase plane on the transmission side is received. Therefore, by using the relation (refer to FIGS. 11A–11C) between the signal point arrangement and a digital signal on the transmission side as it is, the received digital signal can be correctly identified from the signal point arrangement of the received signal point.

However, in practice, the reference carriers $f_{c1}$ and $f_{c2}$ can take various phase states relative to the received carrier, so that the received signal point takes a phase rotated by some angle θ relative to the transmission side. As the phase of the received carrier changes, this angle θ also changes. As the phase of the received signal point changes randomly relative to the transmission side, it is impossible to identify the received digital signal. For example, assuming that θ=n/8, a digital signal (000) at the signal point "0" on the transmission side by the 8PSK modulation method takes a received signal point just at the middle of the signal points "0" and "1". In this case, if it is presumed that the signal was received at the signal point "0", then the digital signal (000) can be received correctly.

However, if it is presumed that the signal was received at the signal point (001), then an error occurs that a digital signal (001) was received. From this reason, the carrier reproduction circuit 10 corrects the phase of the reference carriers $f_{c1}$ and $f_{c2}$ so as to maintain the received signal point at a predetermined rotation angle relative to the transmission side and correctly discriminate the digital signals.

More specifically, a VCO (voltage controlled oscillator) 11 of the carrier reproduction circuit 10 oscillates at a transmission carrier frequency to generate the reference carrier $f_{c1}$. The reference carrier $f_{c2}$ is generated by delaying the phase of the oscillation signal of VCO 11 by 90° by a phase shifter 12. By varying the control voltage to VCO 11, the phases of the reference carriers $f_{c1}$ and $f_{c2}$ can be changed.

The carrier reproduction circuit 10 has phase error tables 13, 14-1 and 14-2, and 15-1 to 15-4 made of ROM and corresponding to the modulation methods of 8PSK, QPSK and BPSK (refer to FIG. 12). Each table stores a correspondence between various data pairs of the I and Q baseband signals I(8) and Q(8) and carrier phase error data ΔΦ(8) (hereinafter simply called also phase error data) having the quantization bit number of 8 bits (2's complement). Each of the tables 13, 14-1 and 14-2, and 15-1 to 15-4 is input with the I and Q baseband signals I(8) and I(8) in parallel. The phase error table selectively enabled by a selector to be described later outputs the phase error data ΔΦ(8) corresponding to the I and Q baseband signals I(8) and Q(8) input from the demodulation circuit 1.

The phase error table 13 is used for 8PSK. The relation between a phase angle Φ (refer to FIG. 13) and the phase error data ΔΦ(8) is shown in FIG. 15, the phase angle Φ being a phase angle of the received signal point on the I-Q phase plane determined by the I and Q baseband signals I(8) and Q(8) input from the demodulation circuit 1. While the demodulation circuit 1 demodulates the digitally modulated signal of BPSK modulation (this demodulation being designated by the modulation method identification signal DM of the transmission configuration identification circuit 9 to be later described), the selector 16 enables (activates) only the phase error table 13 and reads the phase error data ΔΦ(8) corresponding to the I(8) and Q(8) paired data, in response to a clock CLKSYB (refer to FIG. 9(B) of the symbol rate synchronized with the output of the I and Q base band signals 1(8) and Q(8) from the demodulation circuit 1, each time the demodulation circuit I outputs the I and Q baseband signals 1(8) and Q(8) of one symbol. The phase error data ΔΦ(8) is converted into a phase error voltage by a D/A converter 17, its low frequency components being removed by an LPF 18, and supplied to VCO 11 as its control voltage. If the phase error data ΔΦ(8) is 0, an output of LPF 18 does not change and the phases of the reference carriers $f_{c1}$ and $f_{c2}$ do not change. However, if the phase error data ΔΦ(8) is positive, the output of LPF 18 becomes large and the phases of the reference carriers $f_{c1}$ and $f_{c2}$ are delayed, or conversely, if the phase error data ΔΦ(8) is negative, the output of LPF 18 becomes small and the phases of the reference carriers $f_{c1}$ and $f_{c2}$ are advanced.

In the phase error table 13, a difference between Φ and the phase of the nearest signal point in the signal point arrangement of "0" to "7" is indicated by the phase error data ΔΦ(8). The digital signal on the transmission side by the 8PSK modulation method at the signal point having the phase 0, n/4, 2π/4, 3π/4, 4π/4, 5π/4, 6π/4, or 7π/4 is rotated on the I-Q phase plane on the reception side by Θ=m×n/4 (where m is an optional integer from 0 to 7, refer to FIG. 14). Θ is a reception signal phase rotation angle. Since the received signal point of the 8PSK modulation method is positioned at the phase of 0, n/4, 2π/4, 3π/4, 4π/4, 5π/4, 6π/4, or 7π/4, the phase of the signal point arrangement of "0" to "7" on the I-Q phase plane on the reception side can be assigned to the same phase as the transmission side (depending upon Θ, the relation between the signal point arrangement and digital signal changes). By detecting Θ, an inverse phase rotation by −Θ is performed so that the relation between the signal point arrangement and digital signal can be made the same as the transmission side (absolute phasing) and the received digital signal can be easily discriminated.

The phase error tables 14-1 and 14-2 are used for QPSK. The relation between a phase angle Φ and the phase error data ΔΦ(8) is shown in FIGS. 16 and 17, the phase angle Φ being a phase angle of the received signal point on the I-Q phase plane determined by the I and Q baseband signals I(8) and Q(8). During the normal reception, while the demodulation circuit 1 demodulates the digital modulated signal of QPSK modulation, the selector 16 enables only the phase error table 14-1 and reads the phase error data ΔΦ(8) corresponding to the 1(8) and Q(8) paired data, if the reception signal phase rotation angle Θ is 0, 2π/4, 4π/4, or 6π/4, in response to the clock CLKSYB of the symbol rate and each time the demodulation circuit 1 outputs the I and Q baseband signals I(8) and Q(8) of one symbol.

In the phase error table 14-1, a difference between Φ and the phase of the nearest signal point in the signal point arrangement of "1", "3", "5" and "7" is indicated by the phase error data ΔΦ(8). The digital signal on the transmission side using the QPSK modulation method at the signal point "1", "3", "5", or "7" having the phase n/4, 3π/4, 5π/4, or 7π/4 is rotated on the I-Q phase plane on the reception side by Θ. If Θ is 0, 2π/4, 2π/4, or 6π/4, the received signal point of the QPSK modulation method is at the phase of π/4, 3π/4, 5π/4, or 7π/4. By detecting Θ, an inverse phase rotation by −Θ is performed so that the relation between the signal point arrangement and digital signal can be made the same as the transmission side (absolute phasing) and the received digital signal can be easily discriminated.

While the demodulation circuit 1 demodulates the digital modulated signal of QPSK modulation, the selector 16 enables only the phase error table 14-2 and reads the phase error data ΔΦ(8) corresponding to the I(8) and Q(8) paired data, if the reception signal phase rotation angle Θ is π/4, 3π/4, 5π/4, or 7π/4, each time the demodulation circuit 1 outputs the I and Q baseband signals I(8) and Q(8) of one symbol.

In the phase error table 14-2, a difference between Φ and the phase of the nearest signal point in the signal point arrangement of "0", "2", "4" and "6" is indicated by the phase error data ΔΦ(8). The digital signal on the transmission side using the QPSK modulation method at the signal point "1", "3", "5", or "7" having the phase π/4, 3π/4, 5π/4, or 7π/4 is rotated on the I-Q phase plane on the reception side by Θ. If Θ is π/4, 3π/4, 5π/4, or 7π/4, the received signal point of the QPSK modulation method is at the phase of 0, 2π/4, 4π/4, or 6π/4. By detecting Θ, an inverse phase rotation by −Θ is performed so that the phase on the reception side can be made the same as the transmission side (absolute phasing), the relation between the signal point arrangement and digital signal can be made the same as the transmission side, and the received digital signal can be easily discriminated.

The phase error tables 15-1 to 15-4 are used for BPSK. The relation between a phase angle Φ and the phase error data ΔΦ(8) is shown in FIGS. 18 to 21, the phase angle Φ being a phase angle of the received signal point on the I-Q phase plane determined by the I and Q baseband signals I(8) and Q(8). While the demodulation circuit 1 demodulates the digital modulated signal of QPSK modulation, the selector 16 enables only the phase error table 15-1 and reads the phase error data ΔΦ(8) corresponding to the I(8) and Q(8) paired data, if the reception signal phase rotation angle Θ by the phase correction of the 8PSK modulation method is 0 or 4π/4, in response to the clock CLKSYB of the symbol rate and each time the demodulation circuit 1 outputs the I and Q baseband signals I(8) and Q(8) of one symbol. In the phase error table 15-1, a difference between Φ and the phase of the nearest signal point in the signal point arrangement of "0" and "4" is indicated by the phase error data ΔΦ(8). The digital signal on the transmission side using the BPSK modulation method at the signal point "0" or "4" having the phase 0, or 4π/4 is rotated on the I-Q phase plane on the reception side by Θ. If Θ is 0 or 4π/4, the received signal point of the BPSK modulation method is at the phase of 0 or 4π/4.

While the demodulation circuit I demodulates the digital modulated signal of BPSK modulation, the selector 16 enables only the phase error table 15-2 and reads the phase error data ΔΦ(8) corresponding to the I(8) and Q(8) paired data, if Θ is π/4 or 5π/4, each time the demodulation circuit 1 outputs the I and Q baseband signals I(8) and Q(8) of one symbol.

In the phase error table 15-2, a difference between Φ and the phase of the nearest signal point in the signal point arrangement of "1" and "5" is indicated by the phase error data ΔΦ(8). The digital signal on the transmission side using the BPSK modulation method at the signal point "0" or "4" having the phase 0, or 4π/4 is rotated on the I-Q phase plane on the reception side by Θ. If Θ is π/4 or 5π/4, the received signal point of the BPSK modulation method is at the phase of π/4 or 5π/4.

While the demodulation circuit 1 demodulates the digital modulated signal of BPSK modulation, the selector 16 enables only the phase error table 15-3 and reads the phase error data ΔΦ(8) corresponding to the I(8) and Q(8) paired data, if Θ is 2π/4 or 6π/4, each time the demodulation circuit 1 outputs the I and Q baseband signals I(8) and Q(8) of one symbol.

In the phase error table 15-3, a difference between Φ and the phase of the nearest signal point in the signal point arrangement of "2" and "6" is indicated by the phase error data ΔΦ(8). The digital signal on the transmission side using the BPSK modulation method at the signal point "0" or "4" having the phase 0, or 4π/4 is rotated on the I-Q phase plane on the reception side by Θ. If Θ is 2π/4 or 6π/4, the received signal point of the BPSK modulation method is at the phase of 2π/4 or 6π/4.

While the demodulation circuit 1 demodulates the digital modulated signal of BPSK modulation, the selector 16 enables only the phase error table 15-4 and reads the phase error data ΔΦ(8) corresponding to the I(8) and Q(8) paired data, if Θ is 3π/4 or 7π/4, each time the demodulation circuit I outputs the I and Q baseband signals I(8) and Q(8) of one symbol.

In the phase error table 15-4, a difference between Φ and the phase of the nearest signal point in the signal point arrangement of "3" and "7" is indicated by the phase error data ΔΦ(8). The digital signal on the transmission side using the BPSK modulation method at the signal point "0" or "4" having the phase 0 or 4π/4 is rotated on the I-Q phase plane on the reception side by Θ. If Θ is 3π/4 or 7π/4, the received signal point of the BPSK modulation method is at the phase of 3π/4 or 7π/4. Also in the BPSK modulation, by detecting θ, an inverse phase rotation by −Θ is performed so that the phase on the reception side can be made the same as the transmission side (absolute phasing), the relation between the signal point arrangement and digital signal can be made the same as the transmission side, and the received digital signal can be easily discriminated.

The frame sync detection/reproduction circuit 2 has, as shown in FIG. 22, a BPSK demapper 3, sync detection circuits 40 to 47, a frame sync circuit 5, and an OR gate circuit 53, and a frame sync signal generator 6. The reception signal phase rotation angle detection circuit 8 has delay circuits 81 and 82, a 0°/180° phase rotation circuit 83, averaging circuits 84 and 85, and a reception phase judgement circuit 86.

The I and Q baseband signals I(8) and Q(8) output from the demodulation circuit 1 are input to, for example, the BPSK demapper 3 of the frame sync detection/reproduction circuit 2 for capturing the frame sync signal which was BPSK modulated. A BPSK demapped bit stream B0 is therefore output. The BPSK demapper 3 is made of, for example, a ROM.

Next, the frame sync signal will be described. In the hierarchical transmission method, the frame sync signal is BPSK modulated with a lowest necessary C/N and transmitted. The bit stream of the frame sync signal constituted of 20 bits is (S0S1, . . . , S18S19)= (11101100110100101000), these bits being sequentially transmitted starting from S0. The bit stream of the frame sync signal is described also as "SYNCPAT". This bit stream is converted into the signal point "0" or "4" by the BPSK mapping shown in FIG. 11C on the transmission side, and the converted symbol stream is transmitted.

In order to capture 20 bits BPSK modulated and transmitted, i.e., the frame sync signal of 20 symbol marks, it is necessary to convert the received symbol into a bit by BPSK demapping shown in FIG. 23A in the manner opposite to the mapping on the transmission side. As shown in FIG. 23A, if the demodulated signal is received in a hatched area of the I-Q phase plane on the reception side, it is judged that the signal is "0", whereas if it is received in an area other than the hatched area, it is judged that the signal is "1". Namely, depending upon whether the signal is received in which one of the two judgement areas divided by a BPSK judgement border line indicated by a thick line in FIG. 23A, the output is judged as either "0" or "1". In this manner, the BPSK demapping is performed.

The I and Q baseband signals I(8) and Q(8) are input to the BPSK demapper 3 to be subjected to the BPSK demapping and the BPSK demapper 3 outputs the BPSK demapped bit stream B0. In this specification, demapping is intended to mean a demapping circuit. The bit stream B0 is input to the sync detection circuit 40 which captures the bit stream of the frame sync signal from the sync detection circuit 40.

Next, the sync detection circuit 40 will be described with reference to FIG. 24. The sync detection circuit 40 has serially connected 20 D-type flip-flops (hereinafter described as D-F/F) D19 to D0 which constitute a shift register of 20 steps. The bit stream B0 is input to D-F/F D10 and sequentially shifted up. At the same time, outputs from D-F/F D19 to D0 are supplied to an AND gate 51, with predetermined bits being logically inverted. The AND gate 51 outputs a high level SYNA0 when the output state (D0D1, ..., D18D19) becomes (11101100110100101000). Namely, when SYNCPAT is captured, SYNA0 takes a high level.

The output SYNA0 of the sync detection circuit 40 is input via the OR gate circuit 53 to the frame sync circuit 5. The frame sync circuit 5 judges that the frame synchronization was established if the output SYNA of the OR gate circuit repetitively took the high level at a predetermined frame period, and outputs a frame sync pulse at each frame period.

Generally, in the hierarchical transmission method by which signals modulated by a plurality of modulation methods having different necessary C/N are multiplexed in time and repetitively transmitted one frame after another, header data representative of the multiplex configuration is multiplexed (TMCC pattern shown in FIG. 9A). After the frame sync detection/reproduction circuit 2 judges that the frame synchronization was established, the transmission configuration discrimination circuit 9 derives TMCC indicating the multiplex configuration from the BPSK demapped bit stream input from the frame sync circuit 5, analyzes it and outputs the modulation method identification signal DM indicating the modulation method for the current I and Q base band signals, to the selector 16 and the like (refer to FIG. 9(B)). Also, after the frame sync detection/reproduction circuit 2 judges that the frame synchronization was established, the reception signal phase rotation angle detection circuit 8 detects the reception signal phase rotation angle $\Theta$ in accordance with the reproduced sync signal output from the frame sync signal generator 6, and outputs a reception signal phase rotation angle signal AR of 3 bits to the remapper 7, a selector 16 of the carrier regeneration circuit 10, and the like.

After the modulation method identification signal DM is input from the transmission configuration identification circuit 9 and the reception signal phase rotation angle signal AR 3) is input from the reception signal phase rotation angle detection circuit 8, the selector 16 of the carrier reproduction circuit 10 reads the phase error data $\Delta\Phi(8)$ from the phase error table corresponding to the modulation method and reception signal phase rotation angle $\Theta$, and outputs it to the D/A converter 17. During the period before this operation, the selector 16 reads the phase error data $\Delta\Phi(8)$ from the phase error table for 8PSK.

The demodulation circuit I therefore operates always as an 8PSK demodulation circuit until the transmission configuration identification circuit 9 discriminates the multiplex configuration and the reception signal phase rotation angle detection circuit 8 detects the reception signal phase rotation angle $\Theta$. Therefore, depending upon the phase state of the reference carriers $f_{c1}$ and $f_{c2}$ reproduced by the carrier reproduction circuit 10 of the demodulation circuit 1, the received signal point rotates in phase by $\Theta=m\times\pi/4$ (m is an integer of 0 to 7).

More specifically, as shown in FIG. 11C, depending upon the phase state of the reference carriers $f_{c1}$ and $f_{c2}$, the received signal point of the symbol stream of the frame sync signal BPSK mapped to the signal point "0" for the bit "0" and the signal point "4" for the bit "1" may take one of the following eight phase states for the demodulated frame sync signal. The eight phase states include: the signal points "0" and "4" at $\Theta=0$ same as the transmission side; the signal points "1" and "5" rotated by $\Theta=\pi/4$ in phase; the signal points "2" and "6" rotated by $\Theta=2\pi/4$ in phase; the signal points "3" and "7" rotated by $e=3\pi/4$ in phase; the signal points "4" and "0" rotated by $8=4\pi/4$ in phase; the signal points "5" and "1" rotated by $\Theta=5\pi/4$ in phase; the signal points "6" and "2" rotated by $\Theta=6\pi/4$ in phase; and the signal points "7" and "3" rotated by $=7\pi/4$ in phase. It is therefore necessary to capture the frame sync signal even if it is demodulated in any one of the phase states.

As shown in FIG. 25, the BPSK demapper 3 is therefore constituted of BPSK demappers 30 to 37 corresponding to the phase rotations of $\Theta=0$ (m=0), $\Theta=\pi/4$ (m=1), $\Theta=2\pi/4$ (m=2), $\Theta=3\pi/4$ (m=3), $\Theta=4\pi/4$ (m=4), $\Theta=5\pi/4$ (m=5), $\Theta=6\pi/4$ (m=6), and $\Theta=7\pi/4$ (m=7).

BPSK demapping shown in FIG. 23B shows that the symbol stream of the demodulated frame sync signal is rotated in phase by $\Theta=\pi/4$, the bit "0" is at the signal point "1" and the bit "1" is at the signal point "5". The BPSK judgement border line indicated by a thick line in FIG. 23B is rotated by $\pi/4$ in the counter-clockwise direction relative to the BPSK judgement border line indicated by the thick line in FIG. 23A of the BPSK demapping when the frame sync signal is received at the same phase as the transmission side. By using the BPSK demapper (at 31 in FIG. 25) for the BPSK demapping shown in FIG. 23B, the frame sync signal rotated in phase by $\Theta=\pi/4$ can be captured stably. The bit stream BPSK demapped by the BPSK demapper 31 is an output B1 of the BPSK demapper 3 shown in FIG. 22.

Similarly, the BPSK demappers 32 to 37 execute demapping by using BPSK judgement border lines rotated by $2\pi/4$, $3\pi/4$, ..., $7\pi/4$ in the counter-clockwise relative to the BPSK judgement border line indicated by the thick line of the BPSK demapping shown in FIG. 23A. It is therefore possible to stably capture the frame sync signal rotated in phase by $\Theta=2\pi/4, 3\pi/4, ..., 7\pi/4$. The bit streams BPSK demapped by the BPSK demappers 32 to 37 correspond to outputs B2 to B7 of the BPSK demapper 3 shown in FIG. 22.

The BPSK demapper-30 executes BPSK demapping by using the BPSK judgement border line indicated by the thick line of the BPSK demapping shown in FIG. 23A, so that the frame sync signal at Θ=0 can be stably captured. The bit stream BPSK demapped by the BPSK demapper 30 is an output B0 of the BPSK demapper 3 shown in FIG. 22.

The structure of the sync detection circuits 40 to 47 is similar to that of the sync detection circuit 40. With these sync detection circuits 40 to 47, irrespective of phase rotation of the baseband signals by the phase state of the reference carriers $f_{c1}$ and $f_{c2}$ reproduced by the carrier reproduction circuit 10 of the demodulation circuit 1, the frame sync signal can be captured by one of the sync detection circuits 40 to 47, and the high level SYNAn (n is an integer of 0 to 7) can be output from the sync detection circuit which captured the frame sync signal.

SYNAn signals output from the sync detection circuits 40 to 47 are input to the OR gate circuit 53 which outputs a logical sum SYNA of the signals SYNAn. The frame sync circuit 5 judges that the frame synchronization was established, if it is confirmed that the high level SYNA is repetitively input at the predetermined frame period, and outputs a frame sync pulse FSYNC at each frame period. In response to the frame sync pulse FSYNC output from the frame sync circuit 5, the frame sync signal generator 6 generates a bit stream (this is called a reproduced frame sync signal) same as the pattern SYNCPAT of the frame sync signal captured by the BPSK demapper 3, sync detection circuits 40 to 47 and frame sync circuit 5.

In the above description, the frame sync detection/reproduction circuit 2 shown in FIG. 22 captures the frame sync signal from the I and Q symbol stream data I(8) and Q(8) output from the demodulation circuit 1, and after a predetermined time delay, the frame sync signal generator 6 outputs the reproduced frame sync signal.

Next, the transmission configuration identification operation by the transmission configuration identification circuit 9 will be described. Input to the transmission configuration identification circuit 9 are bit streams B0 to B7 output from the BPSK demapper 3 of the frame sync detection/reproduction circuit 2, SYNA0 to SYNA7 output from the sync detection circuits 40 to 47, and a frame sync pulse FSYNC output from the frame sync circuit 5. When the frame sync pulse FSYNC is input, the bit stream Bn corresponding to one of SYNA0 to SYNA7 having repetitive high levels is read. By using a predetermined timing signal generated from the frame sync pulse FSYNC, the TMCC pattern shown in FIG. 9A is derived and analyzed.

Then, the modulation method identification signal DM indicating the modulation method for the current I and Q baseband signals I(8) and Q(8) is output (refer to FIG. 9(B)).

Next, a current reception signal phase rotation angle is obtained from the signal point arrangement of the captured frame sync signal. In accordance with the obtained reception signal phase rotation angle, the demodulated I and Q baseband signals I(8) and Q(8) are inversely rotated in phase. This absolute phasing will be described.

Each symbol of the symbol stream of the frame sync signal BPSK mapped at the transmission side and transmitted and then demodulated into the I and Q baseband signals I(8) and Q(8) by the modulation circuit 1 is demapped by the BPSK demapper 3 into the bit "0" or "1". The symbol demapped into the bit "0" has a phase different of 180° from that of the symbol demapped into the bit "1". The symbol demapped into the bit "1" in the frame sync signal of the received symbol stream is rotated in phase by 180° to obtain a symbol stream whose bits are all demapped into the bit "0".

By calculating an average value for a plurality of symbols of the symbol stream whose bits are all demapped into the bit "0", the reception signal point for the bit "0" of BPSK can be obtained. A phase difference is calculated between the reception signal point for the bit "0" of BPSK and the signal point "0" mapped into the bit "0" at the transmission side. This phase difference is used as the reception signal phase rotation angle Θ. The demodulated I and Q baseband signals are rotated in phase by η=−Θ to perform absolute phasing of the I and Q baseband signals I(8) and Q(8).

As described above, in response to the frame sync pulse from the frame sync circuit 5, the frame sync signal generator 6 generates the bit stream same as the pattern SYNCPAT of the captured frame sync signal, and supplies it as the reproduced frame sync signal to the 0°/180° phase rotation circuit 83 of the reception signal phase rotation angle detection circuit 8. The 0°/180° phase rotation circuit 83 rotates the I and Q baseband signals by 180° in phase for the bit "1" of the bit stream of the supplied reproduced frame sync signal, and does not rotate the I and Q baseband signals for the bit "0".

The timing of the bit stream of the reproduced frame sync signal sent from the frame sync signal generator 6 and the timing of the symbol stream of the frame sync signal in the I and Q symbol streams are made coincident at the input side of the 0°/180° phase rotation circuit 0.83 by the delay circuits 81 and 82. The delay circuits 81 and 82 open their output gates only during the period while the frame sync signal generator 6 outputs a frame sync signal section signal. Therefore, the delay circuits 81 and 82 output the frame sync signal portions of the I and Q symbol streams DI(8) and DQ(8). The I and Q symbol streams DI(8) and DQ(8) are rotated by 180° in phase by the 0°/180° phase rotation circuit 83 for the symbol corresponding to the bit "1" in the bit stream of the reproduced frame sync signal, and are not rotated for the symbol corresponding to the bit "0", to obtain symbol streams VI(8) and VQ(8) which are supplied to the averaging circuits 84 and 85. The symbol streams VI(8) and VQ(8) correspond to the symbol streams when a signal is received which signal was BPSK mapped on the transmission side assuming that all 20 bits constituting the frame sync signal are bits "0".

FIG. 26A shows the signal point arrangement for the I and Q symbol streams I(8) and Q(8) of the frame sync signal received at the reception signal phase rotation angle Θ=0, and FIG. 26B shows the signal point arrangement for the I and Q symbol streams VI(8) and VQ(8) after converted by the 0/1800 phase rotation circuit 83. The I and Q symbol streams VI(8) and VQ(8) are supplied to the averaging circuits 84 and 85 and converted to have a quantization bit length of, for example, about 16 to 18 bits. Thereafter, the I and Q symbol streams are averaged for four frames (16×4= 64 symbols), and the averaged values are output as AVI(8) and AVQ(8) having the original quantization bit length of 8 bits. Averaging the I and Q symbol streams VI(8) and VQ(8) is performed in order to obtain the stable signal point arrangement even if the phase and amplitude of the received baseband signals are changed slightly by degradation of reception C/N.

The received signal point [AVI(8), AVQ(8)] of the signal with the bit "1" BPSK mapped can be obtained by the averaging circuits 84 and 85. Next, the received signal point [AVI(8), AVQ(8)] is input to the phase judgement circuit 86 made of a ROM to obtain the reception signal phase rotation angle Θ in accordance with the reception signal phase rotation angle judgement table on an AVI-AVQ phase plane shown in FIG. 27. A phase rotation angle signal AR(3) of 3 bits (natural binary number) corresponding to 8 is therefore output. In FIG. 27, R=0 to 7 shows the decimal notation of the phase rotation angle signal AR(3). For example, the signal point of a point Z=[AVI(8), AVQ(8)] shown in FIG. 27 corresponds to the reception signal phase rotation angle 8=0 as judged by the reception signal phase rotation angle judgement table. Therefore, R =0, and (000) is output as the reception signal phase rotation angle signal AR(3). If the reception signal phase rotation angle Θ is n/4, then R=1 and (001) is output as the reception signal phase rotation angle signal AR(3).

Upon reception of the reception signal phase rotation angle signal AR(3), the remapper 7 made of ROM rotates the I and Q baseband signals I(8) and Q(8) by an angle corresponding to the reception signal phase rotation angle signal AR(3) to thereby perform absolute phasing.

The operation of the remapper 7 will be described. The remapper 7 constitutes a phase conversion circuit for making the signal point arrangement of the received I and Q baseband signals I(8) and Q(8) have the same signal point arrangement as the transmission side. The reception signal phase rotation angle detection circuit 8 calculates the reception signal phase rotation angle E and supplies the reception signal phase rotation angle signal AR(3) corresponding to the reception signal phase rotation angle κ to the remapper 7. The decimal notation R of the reception signal phase rotation angle signal AR(3) is an integer of 0 to 7, and the relation to the reception signal phase rotation angle Θ is defined by the following equation.

$$R=\Theta/(\pi/4) \tag{1}$$

where 8=m×(n/4) and m is an integer of 0 to 7.

The absolute phasing for the I and Q baseband signals is performed by inverse rotation of the reception signal phase rotation angle Θ, i.e., by phase rotation of −Θ. Therefore, the remapper 7 rotates the input I and Q baseband signals I(8) and Q(8) by an angle η(=−Θ) in phase in accordance with the following equations (2) and (3), and outputs the absolute phased I and Q baseband signals I'(8) and Q'(8) (also described as I' and Q' by omitting the quantization bit number).

$$I'=I \cos(\eta)-Q \sin(\eta) \tag{2}$$

$$Q'=I \sin(\eta)+Q \cos(\eta) \tag{3}$$

After the frame sync detection/reproduction circuit 2 captures the frame sync signal and the frame sync pulse is output, the transmission configuration identification circuit 9 may first identify the transmission configuration, and thereafter the reception signal phase rotation angle detection circuit 8 may detect the reception signal phase rotation angle. Or conversely, the reception signal phase rotation angle detection circuit 8 may first detect the reception signal phase rotation angle, and thereafter the transmission configuration identification circuit 9 may identify the transmission configuration. Alternatively, the reception signal phase rotation angle detection circuit 8 may detect the reception signal phase rotation angle concurrently with the identification of the transmission configuration by the transmission configuration identification circuit 9.

With the above-described conventional receiver, in order to correct the phase of the reference carriers $f_{c1}$ and $f_{c2}$ during the demodulation of QPSK modulation, two phase error tables 14-1 and 14-2 are required, and in order to correct the phase of the reference carriers $f_{c1}$ and $f_{c2}$ during the demodulation of BPSK modulation, three phase error tables 15-1 to 15-3 are required. A memory capacity required therefore becomes large.

An object of the invention is to provide a receiver capable of using a small circuit scale.

DISCLOSURE OF THE INVENTION

A receiver of this invention comprises: demodulation means for demodulating a PSK modulated signal of digital signals modulated by a plurality of PSK modulation method having different numbers of phases and multiplexed in time, by using carriers reproduced by carrier reproduction means, and outputting I and Q symbol stream data; reception signal phase rotation angle detection means for detecting a phase rotation angle relative to a transmission side of the I and Q symbol stream data output from the demodulation means; and inverse phase rotation means for inversely rotating a phase of the I and Q symbol stream data output from the demodulation means by a phase rotation angle detected by the reception signal phase rotation angle detection means, wherein the carrier reproduction means of the reproduction means has phase error tables for respective modulation methods, the tables storing carrier phase error data for various demodulated I and Q symbol stream data pairs, and while the demodulation means demodulates a reception signal corresponding to each of the modulation methods, phase error data corresponding to the demodulated I and Q symbol stream data is read from the phase error table corresponding to the modulation method to correct the phase of the carriers, the receiver being characterized in that: while the demodulation means demodulates the reception signal corresponding to each of the modulation methods, the carrier reproduction means reads the phase error data corresponding to demodulated I and Q symbol stream data output from the inverse phase rotation means from the phase error table corresponding to the modulation method to correct the phase of the carriers.

The phase error data corresponding to the I and Q symbol stream data after the absolute phasing by the inverse phase rotation means is read from the phase error table of the carrier reproduction means. Accordingly, irrespective of what value the reception signal phase rotation angle takes, the received signal point of the I and Q symbol stream data input to the phase error table becomes coincident with that on the transmission side. A single phase error table of the carrier reproduction means can be provided for each modulation method. The number of phase error tables in the carrier reproduction means can be reduced and the circuit scale can be simplified considerably.

BRIEF DESCRIPTION OF THE DRAWINGS

FIGS. 4A and 4B are a diagram illustrating the relation between a binary code and a grey code.

FIG. 6 is a diagram illustrating the correspondence between an input and an output of a binary converter shown in FIG. 5.

FIGS. 9A and 9(B) are a diagram showing an example of the frame structure of the hierarchical transmission method.

DETAILED DESCRIPTION OF THE PREFERRED EMBODIMENTS

The first embodiment of the invention will be described with reference to FIG. 1.

Figure 1:
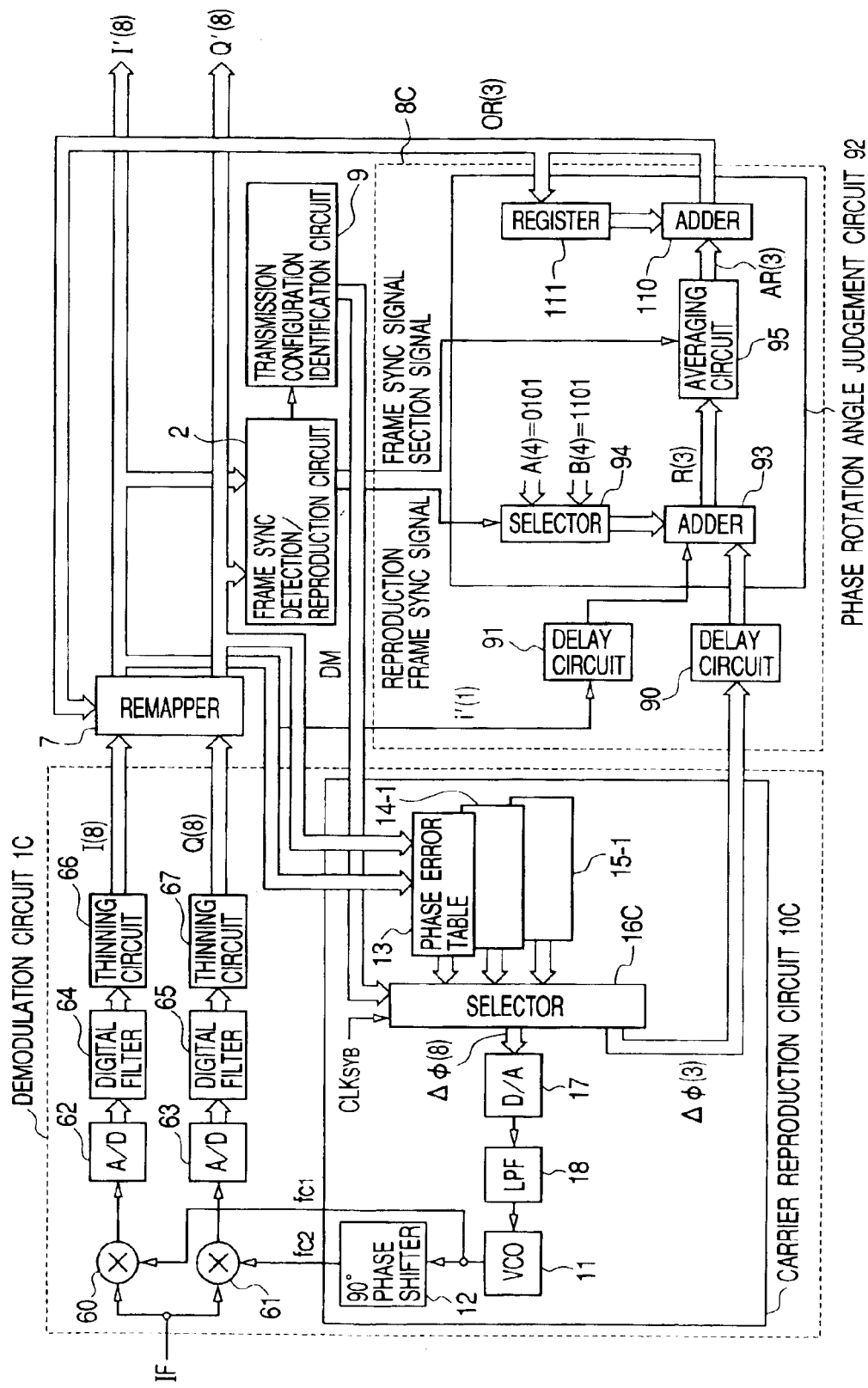
FIG. 1 is a block diagram showing the main portion of a PSK modulated wave receiver according to a first embodiment of the invention.

FIG. 1 is a block diagram showing the main portion of a broadcasting receiver (PSK modulated wave receiver) of this invention. FIG. 1, elements equivalent to those shown in FIG. 10 are represented by identical reference numerals.

Figure 10:
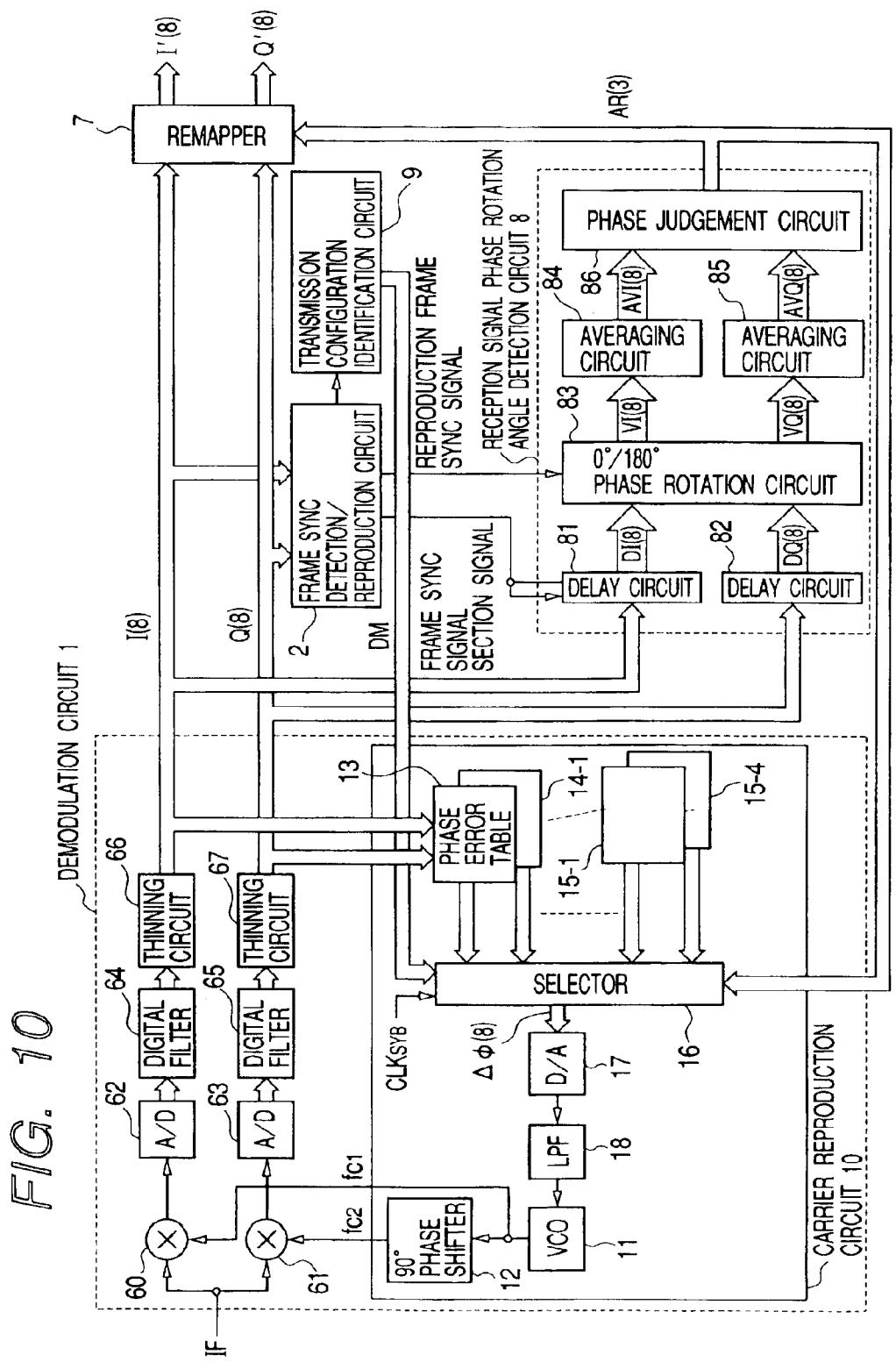
FIG. 10 is a block diagram showing the structure of a demodulation circuit and its peripheral circuits of a PSK modulated wave receiver using a conventional hierarchical transmission method.
Figure 11A:
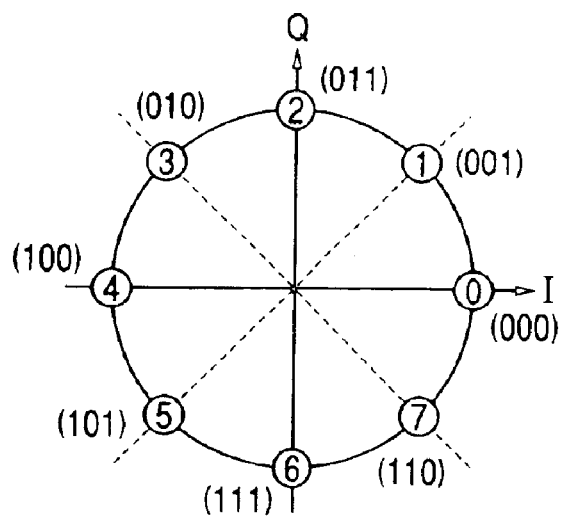
FIGS. 11A, 11B and 11C are a diagram illustrating a signal point arrangement of PSK mapping.
Figure 11B:
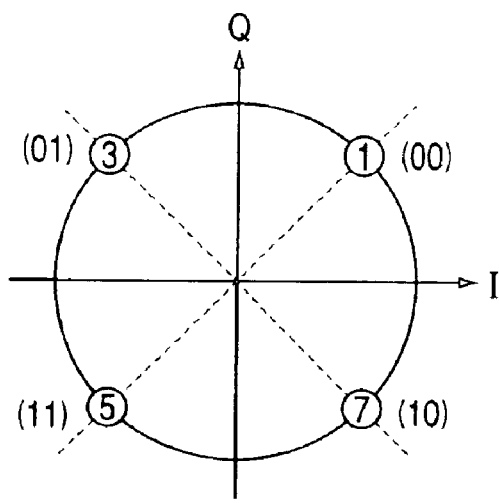
Figure 11C:
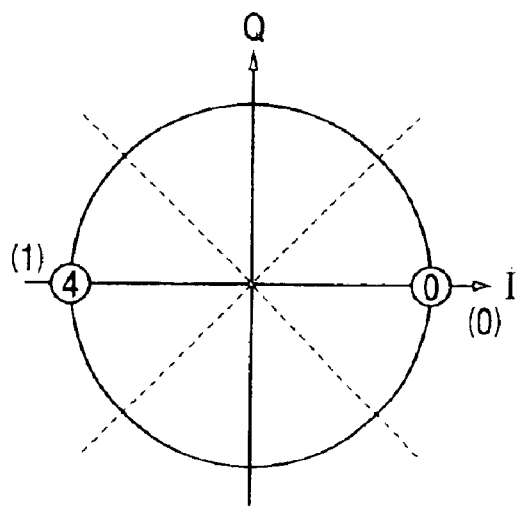
Figure 12:
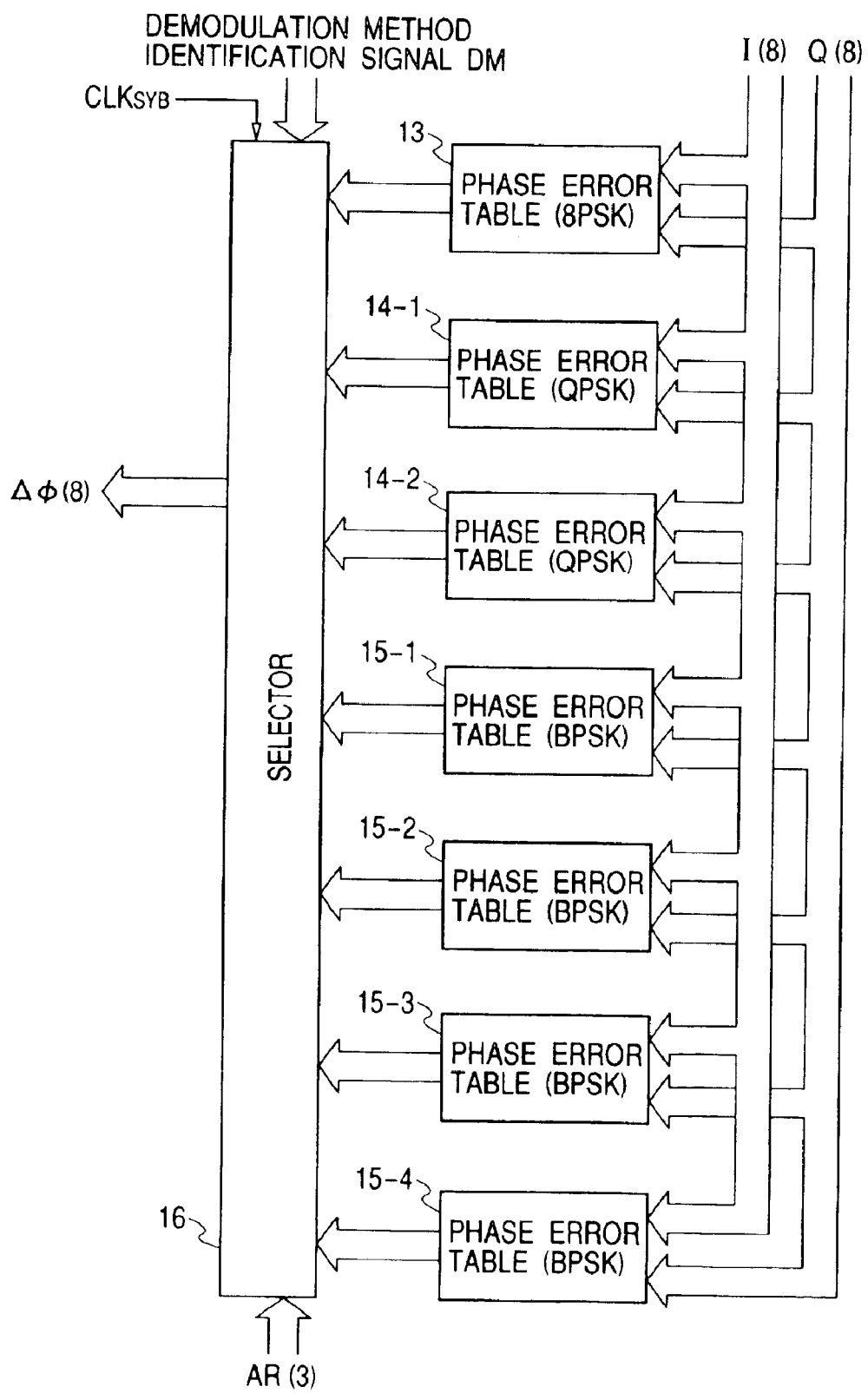
FIG. 12 is a block diagram of a carrier reproduction circuit shown in FIG. 10, with its components partially omitted.
Figure 13:
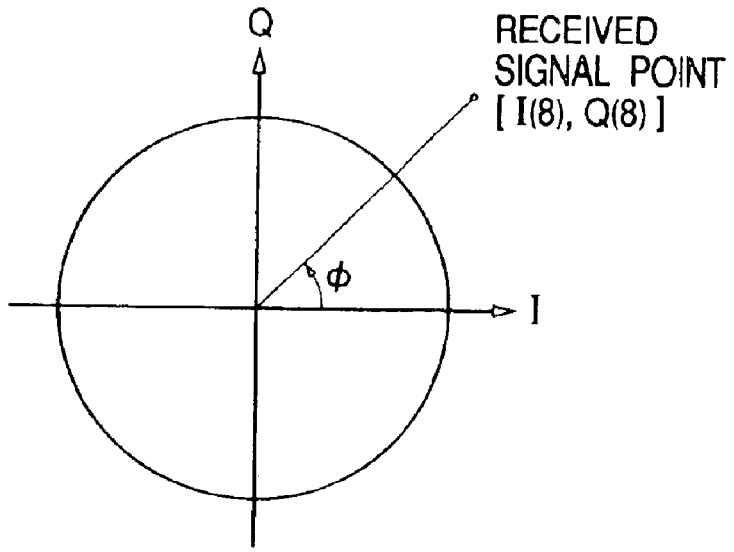
FIG. 13 is a diagram illustrating how the phase of a received signal point is measured.
Figure 14:
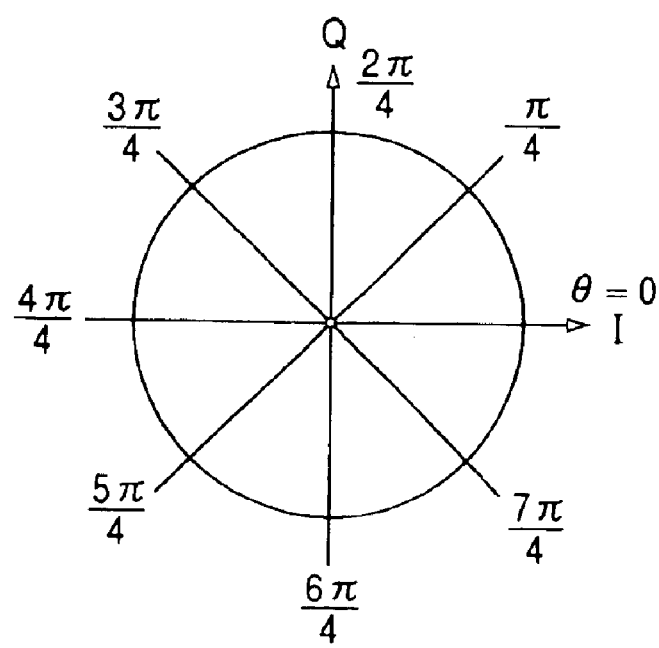
FIG. 14 is a diagram illustrating how a reception signal phase rotation angle is measured.

In the receiver shown in FIG. 10, the carrier wave reproduction circuit has seven phase error tables 13, 14-1, 14-2, and 15-1 to 15-4, and the I and Q symbol stream data I(8) and Q(8) from the demodulation circuit are input to the phase error tables. In the receiver shown in FIG. 10, only three phase error tables 13, 14-1 and 15-1 are used, and the I and Q symbol stream data I'(8) and Q'(8) from the remapper 7 are input to the phase error tables. The remapper 7 outputs input data as it is without phase rotation of the I and Q symbol stream data I(8) and Q(8) output from the demodulation circuit, until the reception signal phase rotation angle detection circuit detects the phase rotation angle.

Figure 15:
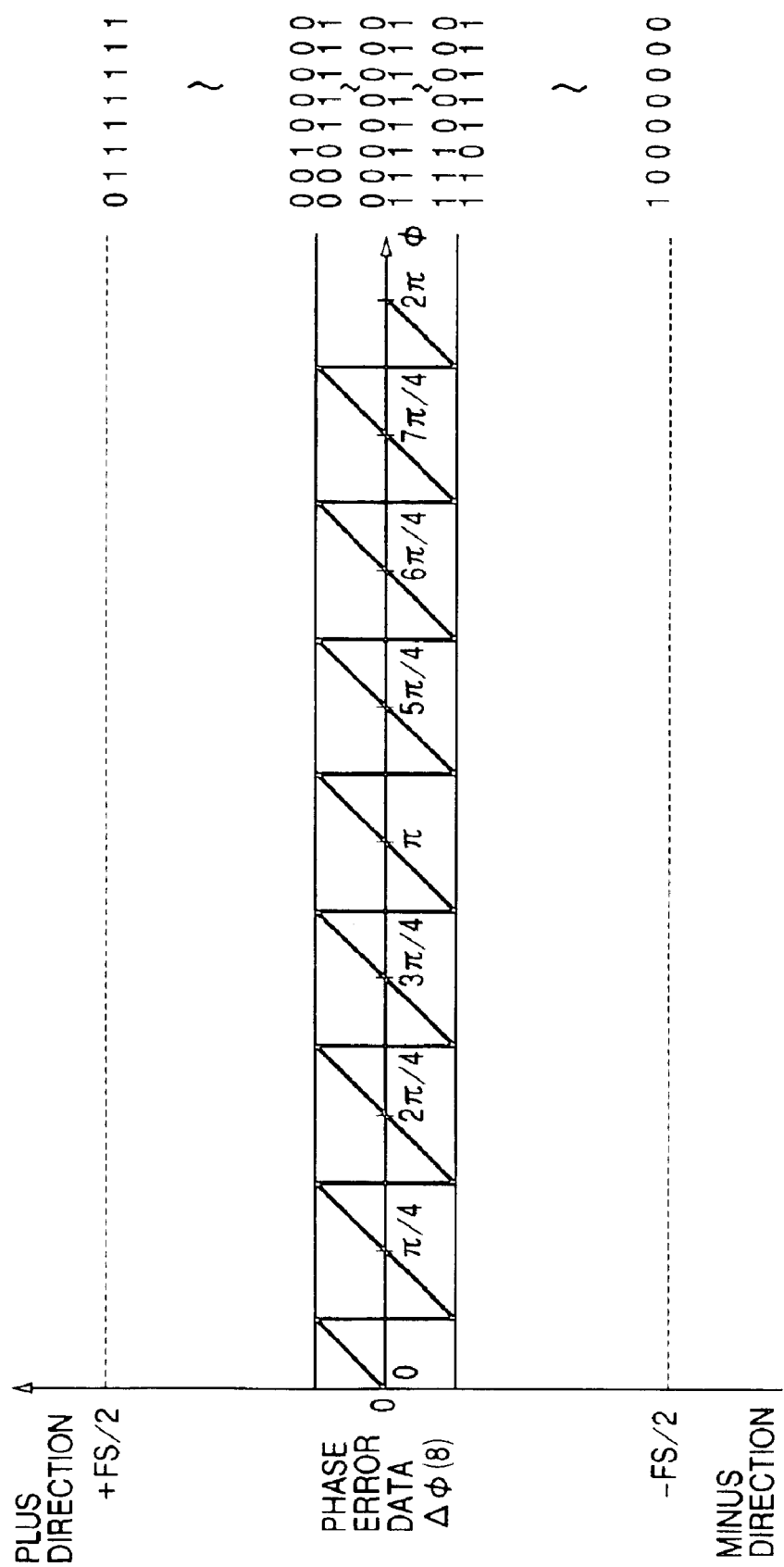
FIG. 15 is a diagram illustrating a phase error table for 8PSK.

After the reception start and until the transmission configuration identification circuit 9 identifies the multiplex configuration of the frame and a reception signal phase rotation angle detection circuit 8C detects the reception signal phase rotation angle (Θ), a selector 16C of the carrier reproduction circuit 10C enables only the 8PSK phase error table 13 (refer to FIG. 15) during the period while the symbol clock CLKsyB takes a high level (an H level section of CLKsyB, refer to FIG. 9(2)), reads the phase error data ΔΦ(8) corresponding to the I and Q symbol stream data I'(8) and Q'(8) output from the remapper 7 during the high level section of the symbol clock CLKsyB, from the phase error table 13, and outputs it to the D/A converter 17. In parallel to the above operations, the selector 16C enables only the BPSK phase error table 15-1 (refer to FIG. 18) during the period while the symbol clock CLKsyB takes a low level (an L level section of CLKsyB, refer to FIG. 9(2)), reads the upper 3 bits (described as phase error data ΔΦ(3)) of the phase error data ΔΦ(8) corresponding to the I and Q symbol stream data I'(8) and Q'(8) output from the remapper 7 during the low level section of the symbol clock CLKsyB, from the phase error table 15-1, and outputs it to the reception signal phase rotation angle detection circuit 8C. It can be judged from the phase error data ΔΦ(3)) whether the absolute value of the phase error is large or smaller than $(\pi/8)+s\times(\pi/4)$ where s is 0 or 1.

After the transmission configuration identification circuit 9 identifies the multiplex configuration of the frame and the reception signal phase rotation angle detection circuit 8C detects the reception signal phase rotation angle (Θ), the selector 16C enables one of the phase error tables 13, 14-1 and 15-1 corresponding to the modulation method of the reception signal demodulated by the demodulation circuit 1C, during the period while the symbol clock $CLK_{SYB}$ takes the high level, reads the phase error data ΔΦ(8) corresponding to the I and Q symbol stream data I'(8) and Q'(8) output from the remapper 7 during the high level section of the symbol clock CLKsyB, from the selected phase error table 13, 14-1, or 15-1, and outputs it to the D/A converter 17. During the period while the symbol clock CLKsyB takes the low level, the selector 16C reads the upper 3-bit phase error data ΔΦ(3) of the phase error data ΔΦ(8) corresponding to the I and Q symbol stream data I'(8) and Q'(8) output from the remapper 7 during the low level section of the symbol clock $CLK_{SYB}$, from the phase error table 15-1.

A delay circuit 90 delays the phase error data ΔΦ(3) read by the selector 16C by a predetermined delay time, and thereafter outputs it. When the frame sync detection/reproduction circuit 2 captures the frame sync signal from the I and Q symbol stream data I'(8) and Q'(8) output from the remapper 7 and starts outputting the start portion of the reproduced frame sync signal, the delay circuit 90 outputs the phase error data ΔΦ(3) corresponding to the start portion of the reproduced frame sync signal, among the I symbol stream data I'(8).

A delay circuit 91 delays the MSB code data i'(1) of the I symbol stream data I'(8) by a predetermined delay time, and thereafter outputs it. When the frame sync detection/reproduction circuit 2 captures the frame sync signal from the I and Q symbol stream data I'(8) and Q'(8) and starts outputting the start portion of the reproduced frame sync signal, the delay circuit 91 outputs the code bit data i'(1) corresponding to the start portion of the reproduced frame sync signal, among the I symbol stream data I'(8).

A phase rotation angle judgement circuit 92 judges, from the portion of the outputs of the delay circuits 90 and 91 corresponding to the frame sync signal, the phase rotation angle relative to the transmission side of the symbols corresponding to the bit "1" of the frame sync signal among the I and Q symbol stream data I'(8) and Q'(8) output from the remapper 7, and also judges the phase rotation angle relative to the transmission side of the symbols corresponding to the bit "0" of the frame sync signal, the judgement results being sequentially output. In the phase rotation angle judgement circuit 92, a 4-bit adder (no carry to the fifth bit) 93 performs addition of 4-bit data. One input side of the adder 93 is input with the output from the delay circuit 91 at the MSB position, and with the output of the delay circuit 90 at the lower three bits. The other input side of the adder 93 is connected to a selector 94. The selector 94 is input with the bit stream of the reproduced frame sync signal output from the frame sync detection/reproduction circuit 2, and outputs A(4)=(0101) when the bit "0" is input, or B(4)= (1101) when the bit "1" is input. The adder 93 outputs the upper 3 bits of the addition result as the reception signal phase rotation angle signal R(3).

An averaging circuit 95 averages the reception signal phase rotation angle signal R(3). For example, the frame sync signals for four frames are averaged and the average is output as the reception signal phase rotation angle signal AR(3). A particular example of the averaging circuit 95 will be later described. A 3-bit adder 110 (no carry to the fourth bit) adds the previous reception signal phase rotation angle signal OR(3) loaded in a register 111 and the current reception signal phase rotation angle signal AR(3), and outputs the addition result to the remapper 7 and the like as a new reception signal phase angle rotation signal OR(3). The register 111 stores the reception signal phase rotation angle signal OR(3) output from the adder 110. The functions of these adder 110 and register 11 will be later described.

The other structure is quite the same as that shown in FIG. 10.

Next, the operation of this embodiment constructed as above will be described.

It is assumed that the register 111 is cleared to (000) in advance.

(1) Reception Start

When the reception starts, the remapper 7 outputs the I and Q symbol stream data I(8) and Q(8) input from the demodulation circuit 1C as the data I'(8) and Q'(8) without phase rotation.

After the reception start and until the transmission configuration identification circuit 9 identifies the multiplex configuration of the frame and the reception signal phase rotation angle detection circuit 8C detects the reception signal phase rotation angle (Θ), the selector 16C of the carrier reproduction circuit 10C enables only the 8PSK phase error table 13 during the period while the symbol clock CLKSYB takes the high level, reads the phase error data ΔΦ(8) corresponding to the I and Q symbol stream data I'(8) and Q'(8) output from the remapper 7 during the high level section of the symbol clock CLKSYB, and outputs it to the D/A converter 17. In parallel to the above operations, the selector 16C enables only the BPSK phase error table 15-1 during the period while the symbol clock CLKSYB takes the low level, reads the upper 3-bit phase error data ΔΦ(3) of the phase error data ΔΦ(8) corresponding to the I and Q symbol stream data I'(8) and Q'(8) output from the remapper 7 during the low level section of the symbol clock CLKSYB, from the phase error table 15-1, and outputs it to the delay circuit 90.

As the selector 16C reads the phase error data ΔΦ(8) from the 8PSK phase error table 13 and outputs it to the D/A converter 17, the phase error data is converted into a phase error voltage by the D/A converter 17, the low frequency components being removed by LPF 18, and a control voltage is applied to VCO 11.

If the phase error data ΔΦ(8) is 0, the output of LPF 18 does not change and the phase of the reference carriers $f_{c1}$ and $f_{c2}$ does not change. If the phase error data ΔΦ(8) is positive, the output of LPF 18 becomes large, and the phase of the reference carriers $f_{c1}$ and $f_{c2}$ is delayed. Conversely, if the phase error data ΔΦ(8) is negative, the output of LPF 18 becomes small, and the phase of the reference carriers $f_{c1}$ and $f_{c2}$ is advanced. In this manner, the phase of the reference carriers $f_{c1}$ and $f_{c2}$ is corrected to maintain a predetermined relation to the phase of reception carriers. The demodulation circuit 1C therefore corrects the position of the digital signal in the signal point arrangement of "0" to "7" having the phase of 0, π/4, 2π/4, 3π/4, 4π/4, 5π/4, 6π/4, or 7π/4 on the transmission side by rotation of θ=m×π/4 (m is an optional integer from 0 to 7) on the I-Q phase plane on the reception side.

Figure 18:
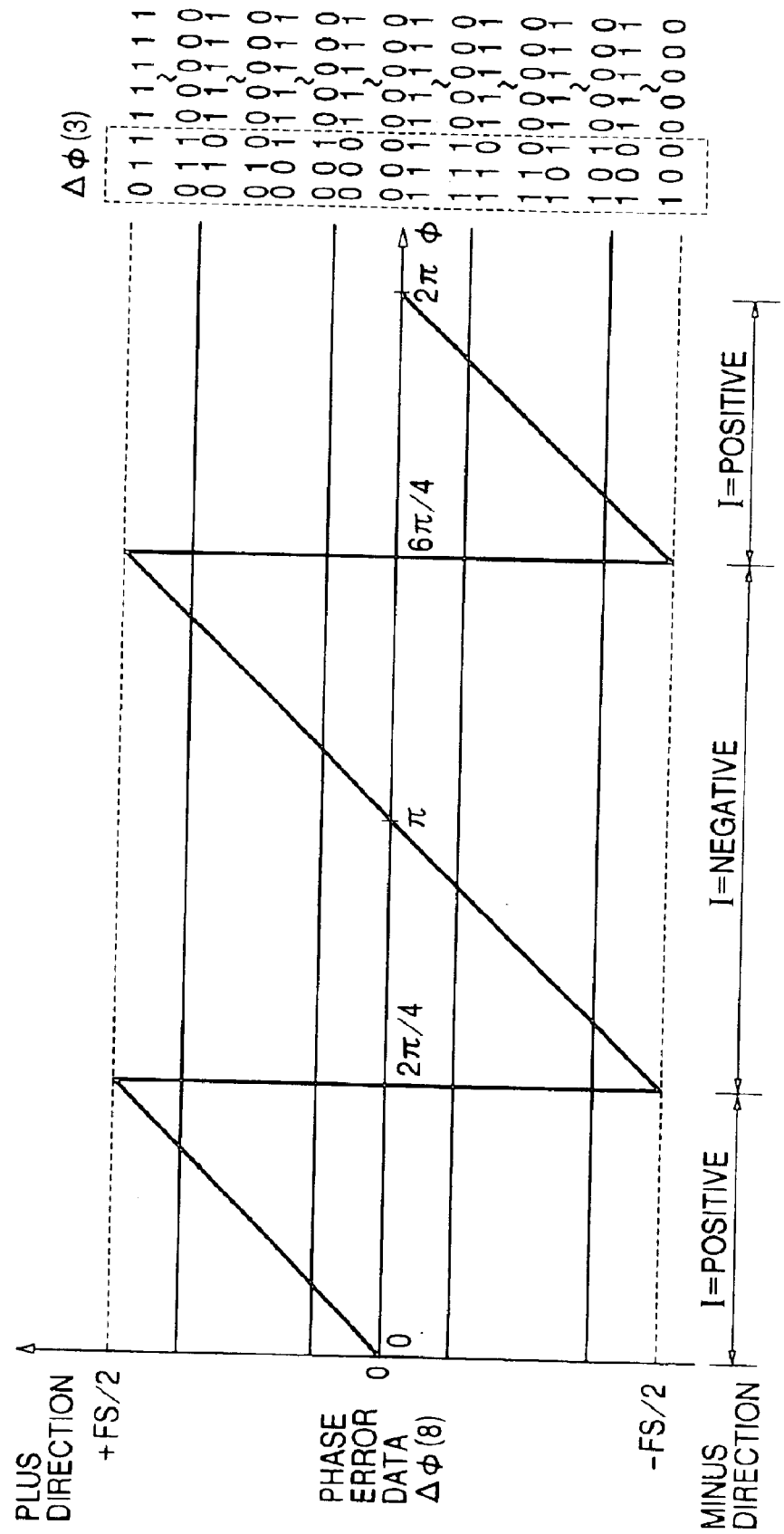
FIG. 18 is a diagram illustrating a phase error table for BPSK.
Figure 19:
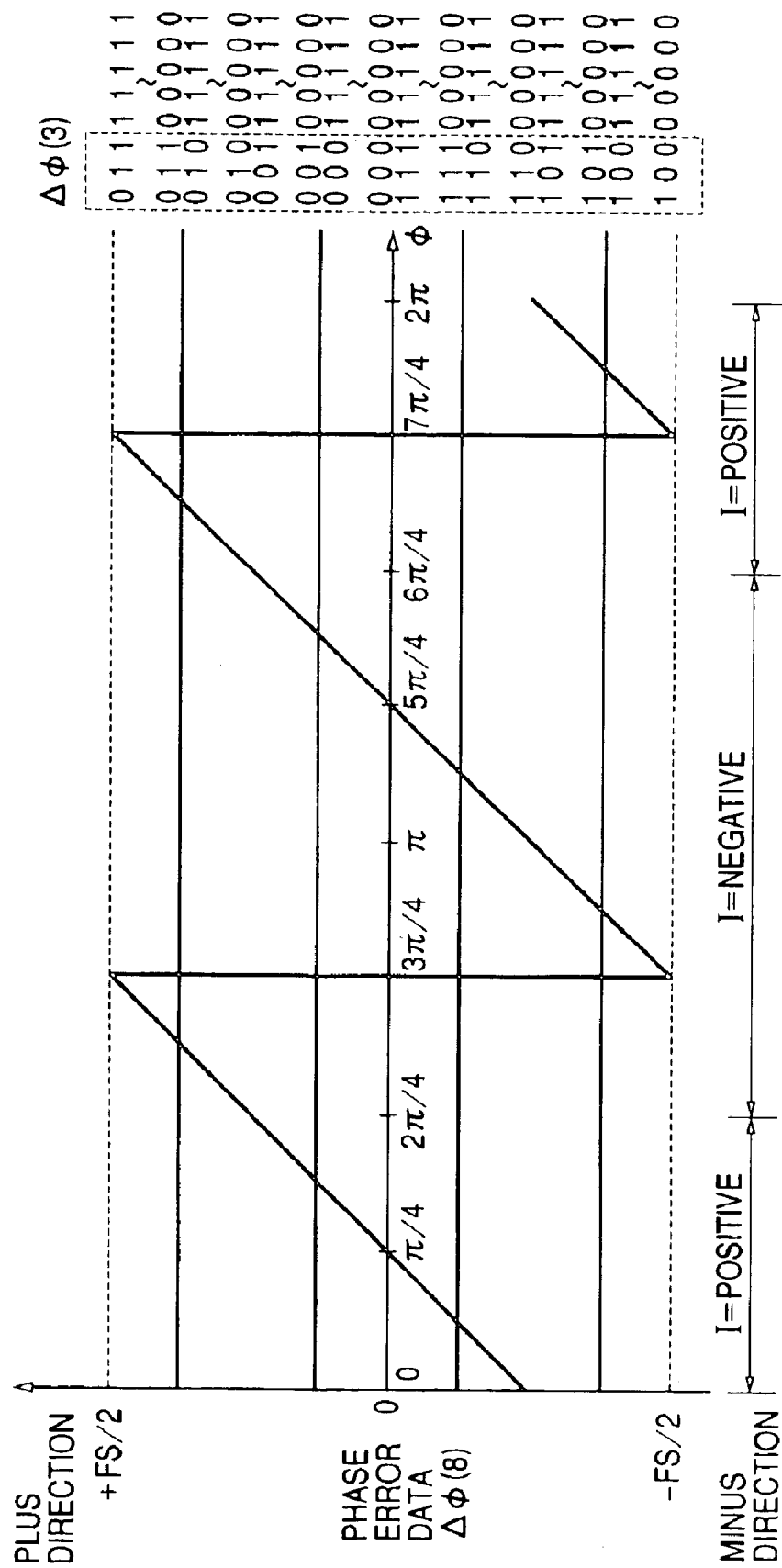
FIG. 19 is a diagram illustrating a phase error table for BPSK.
Figure 20:
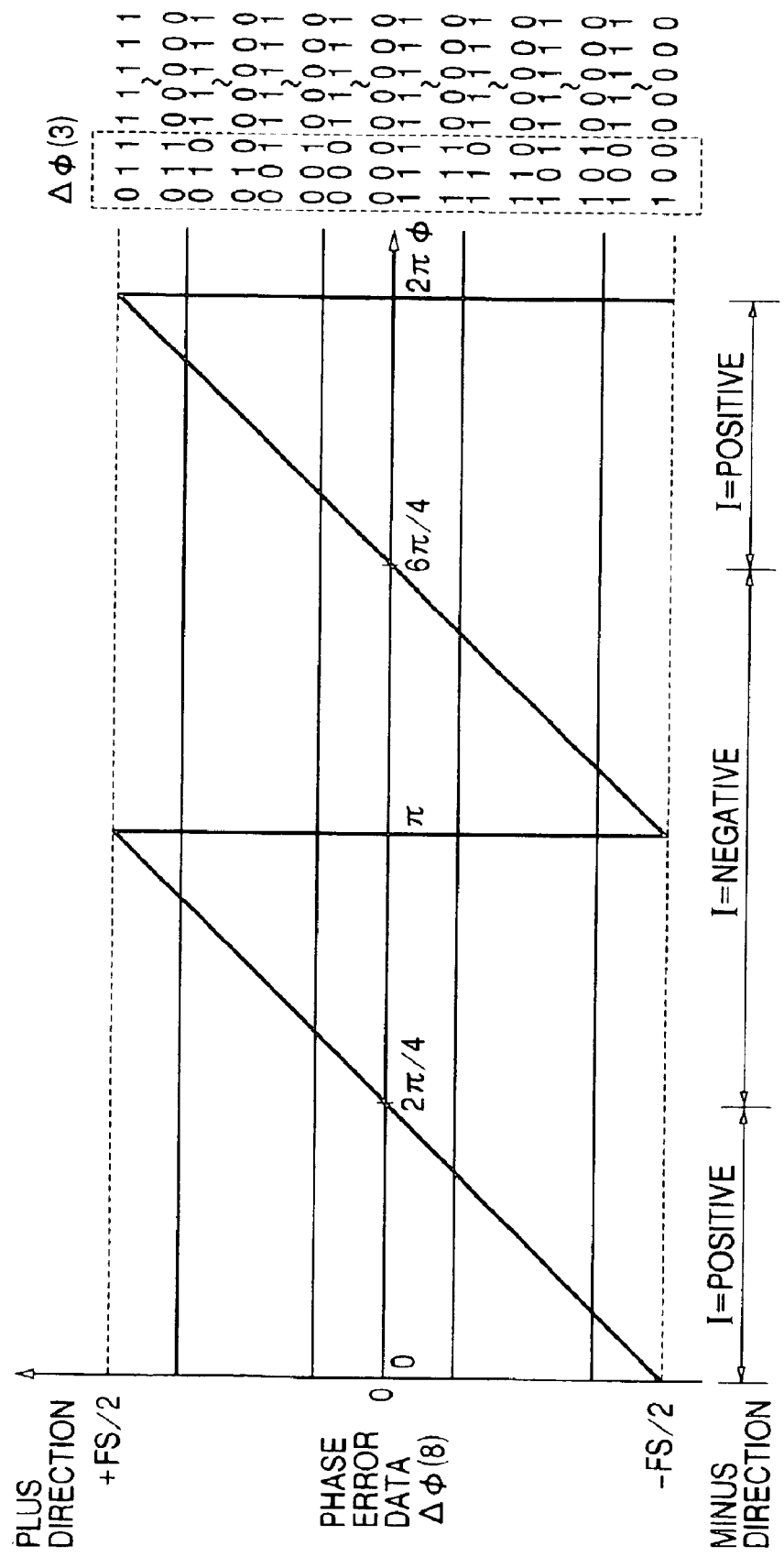
FIG. 20 is a diagram illustrating a phase error table for BPSK.
Figure 21:
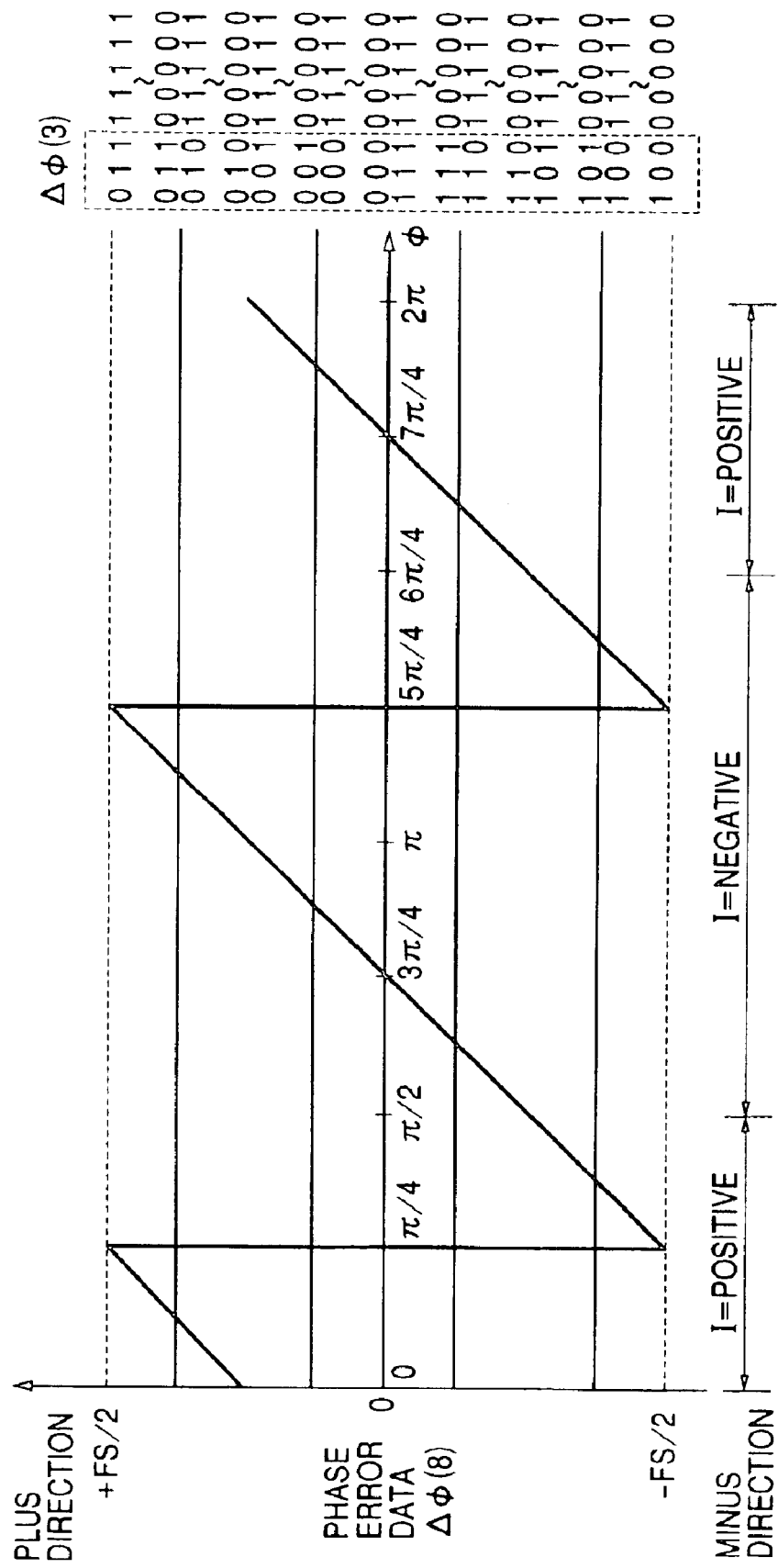
FIG. 21 is a diagram illustrating a phase error table for BPSK.
Figure 22:
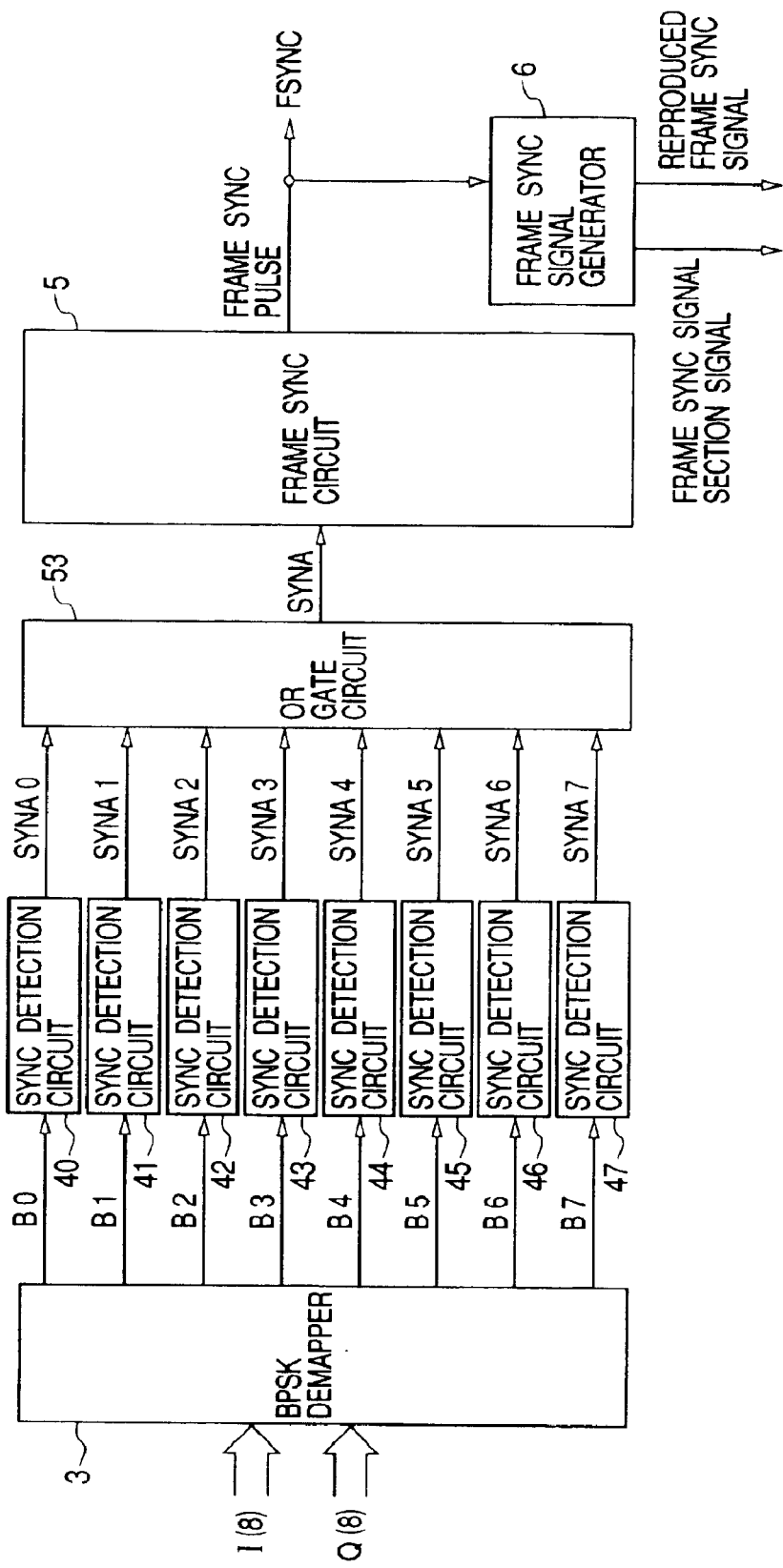
FIG. 22 is a block diagram of a sync detection/reproduction circuit shown in FIG. 10.
Figure 23A:
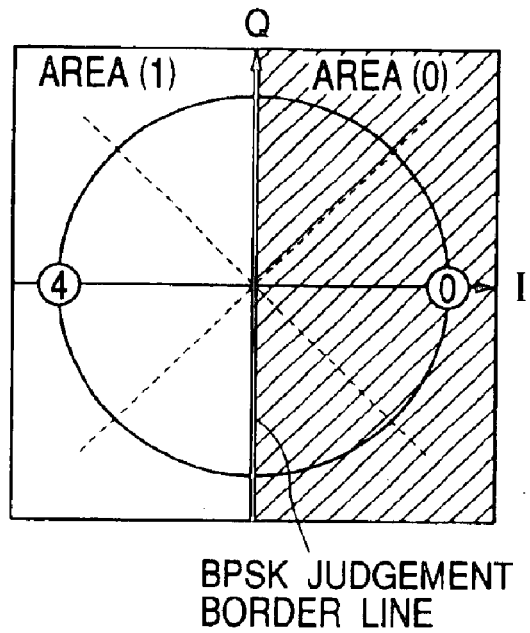
FIGS. 23A and 23B are a diagram illustrating BPSK demapping.
Figure 23B:
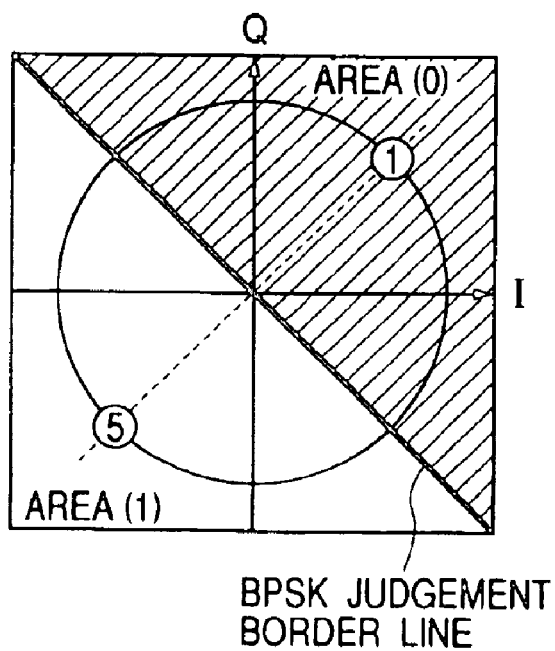
Figure 24:
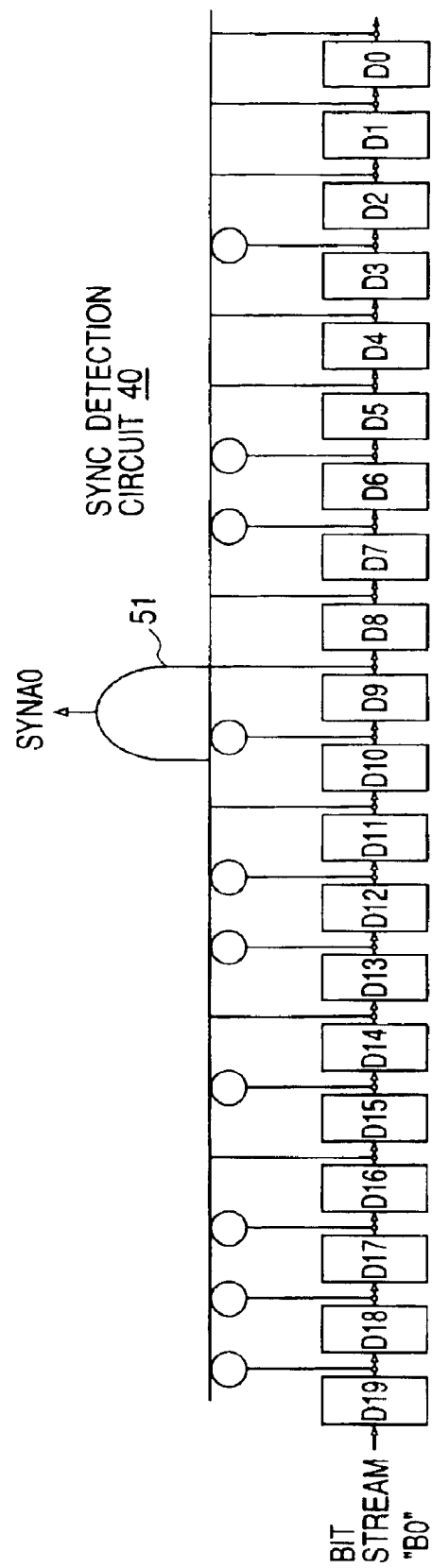
FIG. 24 is a circuit diagram showing the structure of a sync detection circuit shown in FIG. 22.
Figure 25:
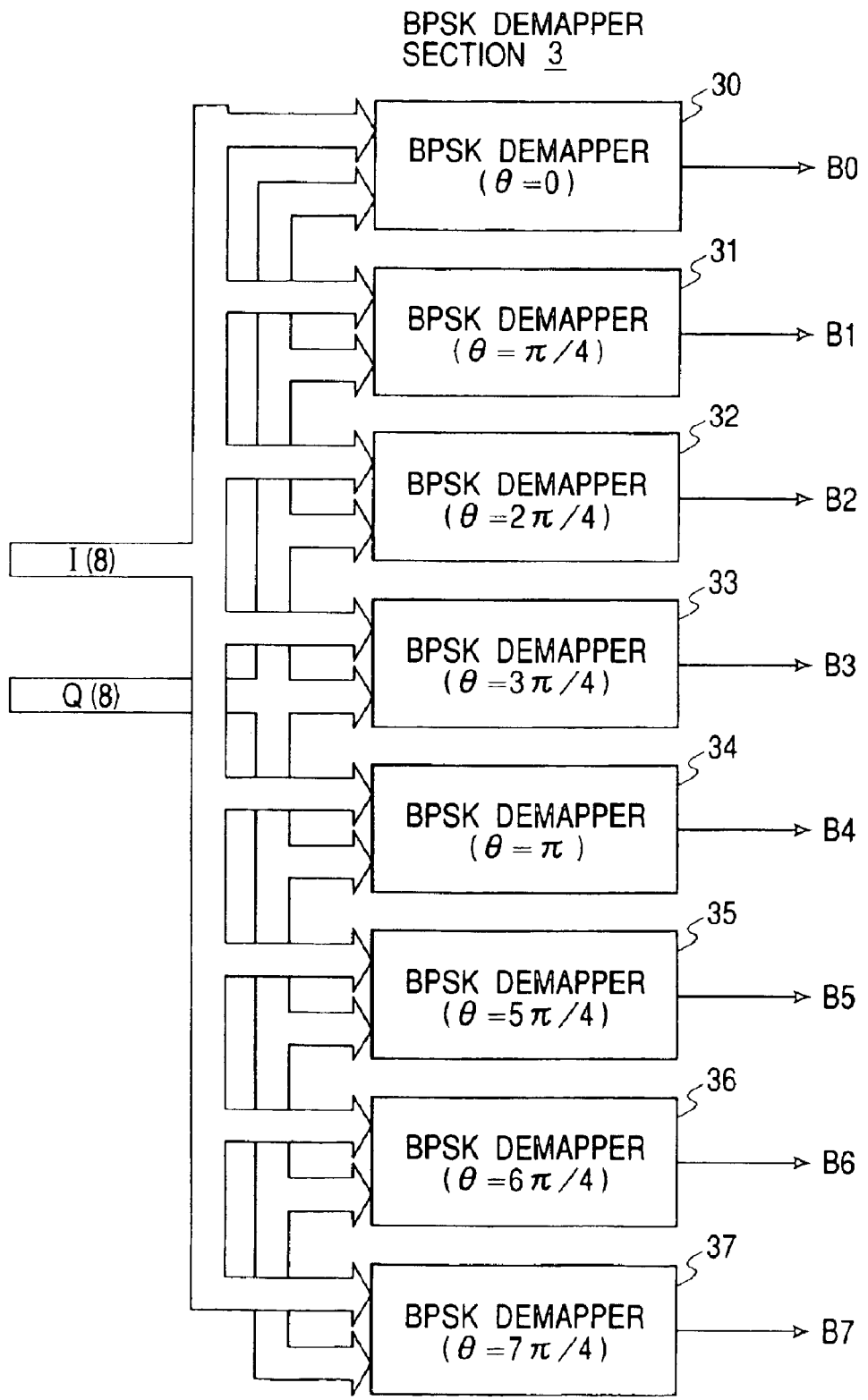
FIG. 25 is a circuit diagram showing the structure of a BPSK demapper shown in FIG. 22.
Figure 26A:
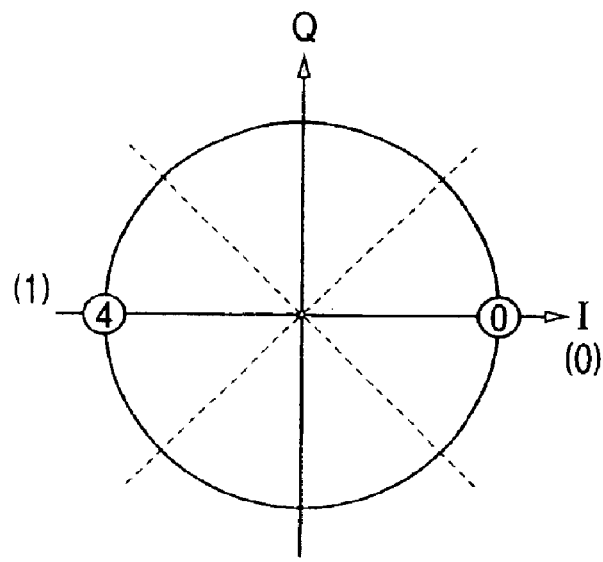
FIGS. 26A and 26B are diagram showing a signal point arrangement of a frame sync signal before and after a 0°/18° phase rotation circuit shown in FIG. 10.
Figure 26B:
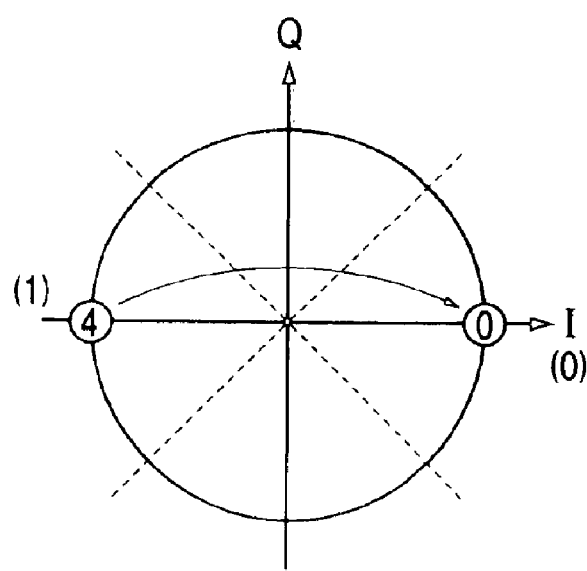
Figure 27:
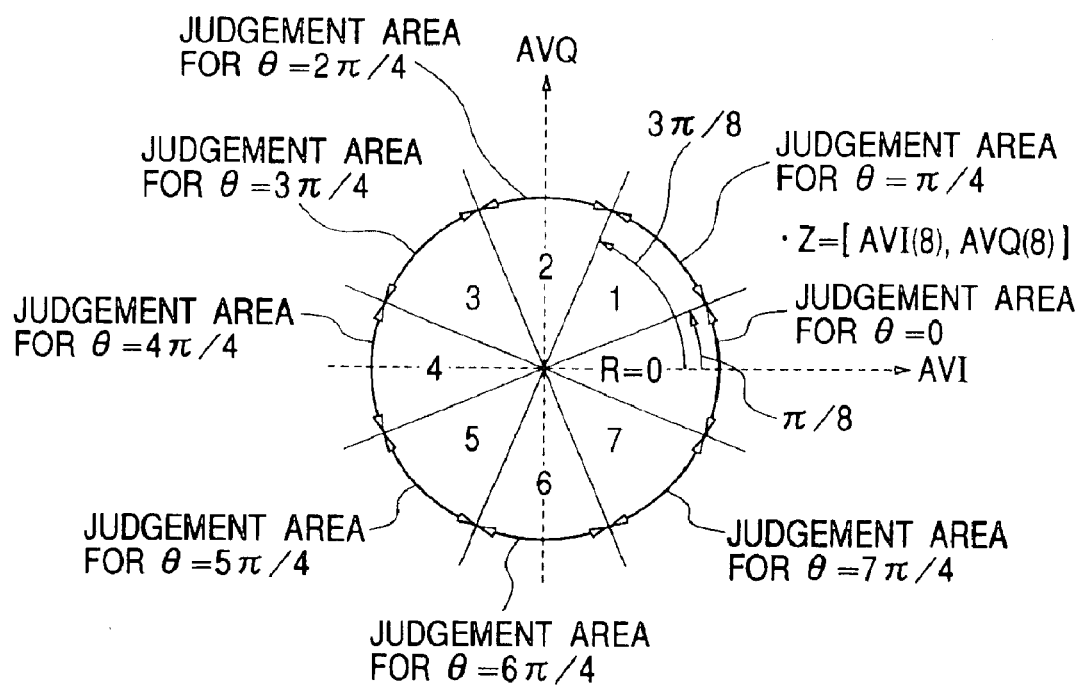
FIG. 27 is a diagram illustrating a reception signal phase rotation angle judgement table used by a phase judgement circuit shown in FIG. 10.

In the phase error table 15-1, the upper three bits ΔΦ(3) of the phase error data ΔΦ corresponding to the I and Q symbol stream data I'(8) and Q'(8) can judge whether the absolute value of the phase error is larger or smaller than (π/8)+s×(π/4) where s is 0 or 1 (refer to FIG. 18). By combining ΔΦ(3) and the MSB code bit data i'(1) of the I symbol stream data I'(8) and performing a simple arithmetic operation, it can be judged whether the received signal point as viewed from the output side of the remapper 7 corresponds to which one of the eight signal points "0" to "7". Since the signal point of the bit "0" or "1" of the frame sync signal on the transmission side is determined as "0" or "4", the reception signal phase rotation angle as viewed from the output side of the remapper 7 can be determined unanimously from the phase error data ΔΦ(3) and the code bit data i'(1) of the I symbol stream data I'(8).

In the reception signal phase rotation angle detection circuit 8C, the delay circuits 90 and 91 delay the phase error data ΔΦ(3) output from the selector 16C and the code bit data i'(1) of the I symbol stream data I'(8) derived from the output of the remapper 7. When the frame sync detection/reproduction circuit 2 captures the frame sync signal from the I and Q symbol stream data I'(8) and Q'(8) and starts outputting the start portion of the frame sync signal, the delay circuit 90 outputs the phase error data ΔΦ(3) corresponding to the start portion of the frame sync signal, among the I symbol stream data I'(8), and the delay circuit 91 outputs the code bit data i'(1) corresponding to the start portion of the frame sync signal, among the I symbol stream data I'(8). The output timings of the delay circuits 90 and 91 are adjusted in this manner. The outputs of the delay circuits 90 and 91 are input to the one input side of the adder 93 as the upper bit and lower bits.

Sometime after the reception start, the frame sync detection/reproduction circuit 2 captures the frame sync signal of the I and Q symbol streams I'(8) and Q'(8) and outputs the reproduced frame sync signal. Then, the selector 94 selects and outputs A(4)=(0101) for the bit "0" of the reproduced frame sync signal, and selects and outputs B(4)=

Figures 2A, 2B:
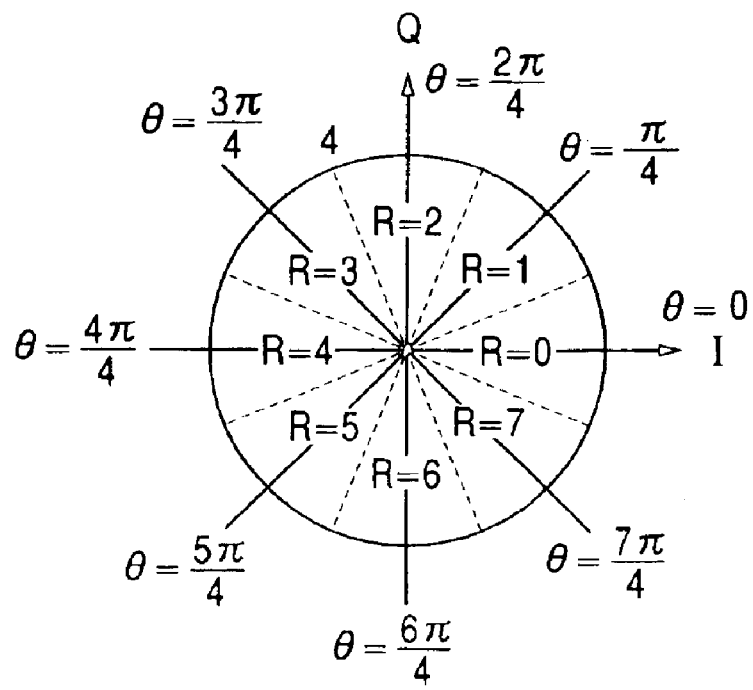
FIGS. 2(A) and 2(B) are a diagram illustrating the relation between a reception signal phase rotation angle signal and a reception signal phase rotation angle output from a phase rotation angle judgement circuit shown in FIG. 1.

(1101). The adder 93 adds one input and the other input at each bit position of the reproduced frame sync signal of 20 bits to output the upper 3 bits. The adder 93 classifies the reception signal phase rotation angle Θ as viewed from the output side of the remapper 7 into 0, π/4, 2π/4, 3π/4, 4π/4, 5π/4, 6π/4, and 7π/4 as shown in FIG. 2(A) which are related to the decimal notation R=0 to 7, to thereby output the reception signal phase rotation angle signal R(3) where R is expressed by the natural binary of 3 bits (refer to FIG. 2(B)).

The averaging circuit 95 fetches the output of the adder 93, while the frame sync signal section signal is input from the frame sync detection/reproduction circuit 2, averages for four frames, and outputs the result as the reception signal phase rotation angle signal AR(3). Averaging the reception signal phase rotation angle signal R(3) is performed in order to obtain the stable reception signal phase rotation angle even if the phase and amplitude of the received baseband signals are changed slightly by degradation of reception C/N.

Figure 3:
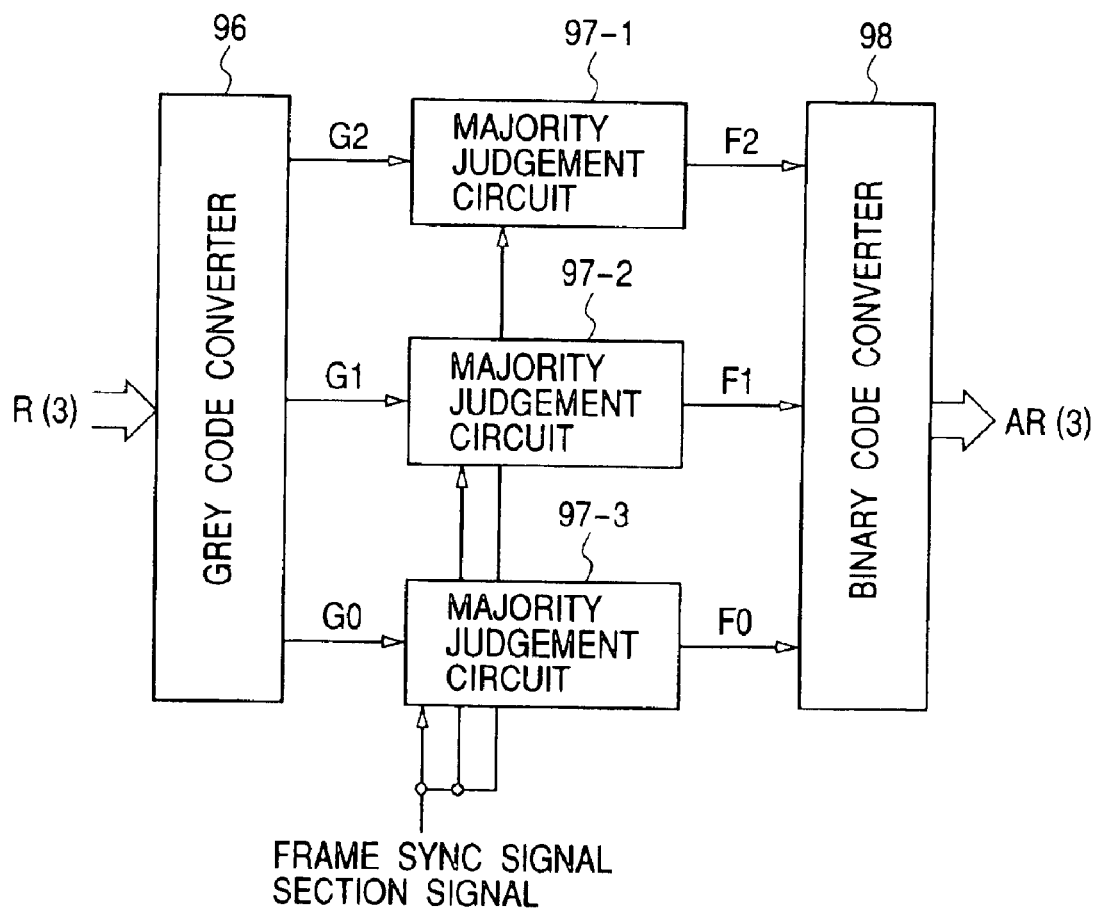
FIG. 3 is a block diagram showing an example of the structure of an averaging circuit shown in FIG. 1.

An example of the averaging circuit 95 is shown in FIG. 3. A grey code converter 96 converts the reception signal phase rotation angle signal R(3) output from the adder 93 into a 3-bit grey code in accordance with the table shown in FIG. 4(1). The grey code has the characteristics that only one bit position of the adjacent two codes is changed. The output side of the grey code converter 96 is connected to majority judgement circuits 97-1 to 97-3 at respective bit positions G0 to G2. While the frame sync signal section signals for the four frames are input, the majority judgement circuit judges which one of the bits "1" and "0" is output from the grey code converter 96 more than the other. Outputs F0 to F2 of the majority judgement circuits 97-1 to 97-3 are input to a binary code converter 98 which performs inverse conversion of the conversion by the grey code converter 96. An output of the binary code converter 98 is output as the reception signal phase rotation angle signal AR(3).

It is possible to perform the majority judgement by directly inputting the output of the adder 93 to the majority judgement circuits 91-1 to 91-3 by omitting the grey code converter 96 and binary code converter 98. However, once the reception signal phase rotation angle signal R(3) is converted into the grey code, a change in the code is only at one bit position even if the phase of the reception signal phase rotation angle signal R(3) changes by π/4. Therefore, even if the phase of the reception signal phase rotation angle signal R(3) erroneously changes by π/4 because of a slight phase and amplitude change in the received baseband signals because of degradation of the reception C/N, this influence can be minimized and reliability can be improved.

The reception signal phase rotation angle signal AR (3) output from the averaging circuit 95 is added by the adder 110 to the value stored in the register 111. Since the initial value is (000), the signal AR(3) itself is output to the remapper 7 as the reception signal phase rotation angle signal OR(3) relative to the transmission side as viewed at the output side of the demodulation circuit 1C, and loaded in the register 111. For example, if the reception signal phase rotation angle Θ represented by OR(3) is 3π/4, the remapper 7 performs the phase rotation by (−3π/4) for the absolute phasing. (011) is stored in the register 111.

(2) Ordinary Reception Operation

Immediately after the frame sync detection/reproduction circuit 2 captures the frame sync signal, the transmission configuration identification circuit 9 identifies the multiplex configuration and outputs the modulation method identification signal DM to the selector 16 and the like, the signal DM indicating the modulation method for the current I and Q symbol stream data I(8) and Q(8) output from the demodulation circuit 1C.

After the reception signal phase rotation angle signal OR(3) is output from the adder 110 and the absolute phasing is performed by the remapper 7, by using the demodulation method identification signal DM input from the transmission configuration identification circuit 9, the selector 16C enables only the phase error table 13 during the period while the symbol clock CLKSYB takes the high level while the demodulation circuit 1C demodulates the signal portion of the 8PSK modulation method, reads the phase error data ΔΦ(8) corresponding to the I and Q symbol stream data I'(8) and Q'(8) output from the remapper 7 from the phase error table 13, and outputs it to the D/A converter 17. As a result, the phase of the reference carriers $f_{c1}$ and $f_{c2}$ is corrected in such a manner that the received signal point of the digital signal (abc) 8PSK mapped on the transmission side to the signal point arrangement "0", "1", "2", "3", "4", "5", "6", or "7" appears at the signal point arrangement "3", "4", "5", "6", "7", "0", "1", or "2" rotated by Θ as viewed at the input side of the remapper 7, when taking into consideration the phase rotation of η=−Θ=−3π/4 of I'(8) and Q'(8) relative to I(8) and Q(8) irrespective of the phase change in the reception carriers.

In this case, the I and Q symbol stream data I(8) and Q(8) of the 8PSK modulation method portion output from the demodulation circuit 1C is rotated by η=−Θ=−3π/4 by the remapper 7 for the absolute phasing. Therefore, the received signal point of the I and Q symbol stream data I'(8) and Q'(8) output from the remapper 7 is coincident with that on the transmission side.

The selector 16C enables only the phase error table 14-1 during the period while the symbol clock CLKSYB takes the high level while the demodulation circuit 1C demodulates the signal portion of the QPSK modulation method, reads the phase error data ΔΦ(8) corresponding to the I and Q symbol stream data I'(8) and Q'(8) output from the remapper 7 from the phase error table 14-1, and outputs it to the D/A converter 17. As a result, the phase of the reference carriers $f_{c1}$ and $f_{c2}$ is corrected in such a manner that the received signal point of the digital signal (de) QPSK mapped on the transmission side to the signal point arrangement "1", "3", "5", or "7" appears at the signal point arrangement "4", "6", "0", or "2" as viewed at the input side of the remapper 7, when taking into consideration the phase rotation of η=−Θ=−3π/4 of I'(8) and Q'(8) relative to I(8) and Q(8). Therefore, the phase rotation angle is retained which is the same as the reception signal phase rotation angle Θ of 8PSK. Since the I and Q symbol stream data I(8) and Q(8) of the QPSK modulation method portion output from the demodulation circuit 1C is rotated by the remapper 7 by η=−Θ=−3π/4, the received signal point of the I and Q symbol stream data I'(8) and Q'(8) output from the remapper 7 is coincident with that on the transmission side.

The selector 16C enables only the phase error table 15-1 during the period while the symbol clock CLKSYB takes the high level while the demodulation circuit 1C demodulates the signal portion of the BPSK modulation method, reads the phase error data ΔΦ(8) corresponding to the I and Q symbol stream data I'(8) and Q'(8) from the phase error table 15-1, and outputs it to the D/A converter 17. As a result, the phase of the reference carriers $f_{c1}$ and $f_{c2}$ is corrected in such a manner that the received signal point of the digital signal (f) BPSK mapped on the transmission side to the signal point arrangement "0" or "4" appears at the signal point arrangement "3" or "7", when taking into consideration the phase rotation of η=−Θ=−3π/4 of I'(8) and Q'(8) relative to I(8)

and Q(8). Therefore, the phase rotation angle is retained which is the same as the reception signal phase rotation angle Θ of 8PSK. Since the I and Q symbol stream data I(8) and Q(8) of the QPSK modulation method portion output from the demodulation circuit 1C is rotated by the remapper 7 by −Θ=−3π/4, the received signal point of the I and Q symbol stream data I'(8) and Q'(8) output from the remapper 7 is coincident with that on the transmission side.

Also in the ordinary reception operation, the selector 16C enables only the phase error table 15-1 during the period while the symbol clock CLKSYB takes the low level, reads the phase error data ΔΦ(8) corresponding to the I and Q symbol stream data I'(8) and Q'(8) output from the remapper 7 during the low level section of the symbol clock CLKSYB, from the phase error table 15-1, and outputs it to the delay circuit 90. The phase rotation angle judgement circuit 92 judges the phase rotation angle from the outputs of the delay circuits 90 and 91, and outputs the judgement result in the form of the reception signal phase rotation angle signal R(3). The averaging circuit 95 averages the signals for four frames and outputs the result as the reception signal phase angle signal AR(3).

When the phase rotation angle judgement circuit 92 and averaging circuit 95 of the reception signal phase rotation angle detection circuit 8C detect the second phase rotation angle and output the reception signal phase rotation angle signal AR(3), this reception signal phase rotation angle signal AR(3) indicates the phase rotation angle relative to the transmission side of I'(8) and Q'(8) after the absolute phasing by the remapper 7. As this signal is added to the previous reception signal phase rotation angle signal OR(3) stored in the register 111, the reception signal phase rotation angle OR(3) relative to the transmission side as viewed at the input side of the remapper 7 can be obtained. This reception signal phase rotation angle OR(3) is output to the remapper 7 to perform the second phase rotation (phase rotation by −Θ where Θ is the reception signal phase rotation angle indicated by OR(3)), and stored in the register 111. Similar operations are repeated each time the phase rotation angle judgement circuit 92 and averaging circuit 95 of the reception signal phase rotation angle detection circuit 8C detect a new phase rotation angle.

In this embodiment, the I and Q symbol stream data I'(8) and Q'(8) after the absolute phasing by the remapper 7 is input to the phase error table of the carrier reproduction circuit 10C. Therefore, during the ordinary reception, irrespective of what value the reception signal phase rotation angle takes, the received signal point of the I and Q symbol stream data I'(8) and Q'(8) input to the phase error table is the same as the transmission side. Therefore, only one phase error table per each modulation method is provided in the carrier reproduction circuit 10C. It is possible to reduce the number of phase error tables in the carrier reproduction circuit 10C and the circuit scale can be simplified considerably.

Of the phase error data in the BPSK phase error table for the I and Q symbol stream data corresponding to the bit "1" or "0" of the demodulated frame sync signal, the upper three bits for judging whether the absolute value of the phase error is larger or smaller than (π/8)+s×(π/4) where s is 0 or 1 and the code bit data i'(1) of the I symbol stream data I'(8) are used for judging the phase rotation angle of the I and Q symbol stream data I(8) and Q(8) corresponding to the bit "1" or "0" of the frame sync signal. The reception signal phase rotation angle can be judged through simple calculation so that a large capacity ROM is not necessary for judging the phase rotation angle and the circuit scale can be made small.

In this embodiment, although the code bit data i'(1) of the I symbol stream data I'(8) is used, the MSB code bit data i'(1) of the Q symbol stream data Q'(8) may also be used. This change can be made by properly changing the values A(4) and B(4) selected by the selector 94.

The phase rotation angle is judged for both the bit "1" and bit "0" of the frame sync signal portion of the I and Q symbol stream data. The phase rotation angle may be judged for one of the bits "1" and "0". The averaging methods by the averaging circuit 5 can be modified in various ways. For example, averaging for only one frame or two frames may be executed, or one bit or a plurality bit at particular positions of the frame sync signal may be used for averaging for a plurality of frames.

Next, a second embodiment of the invention will be described with reference to FIG. 5.

Figure 5:
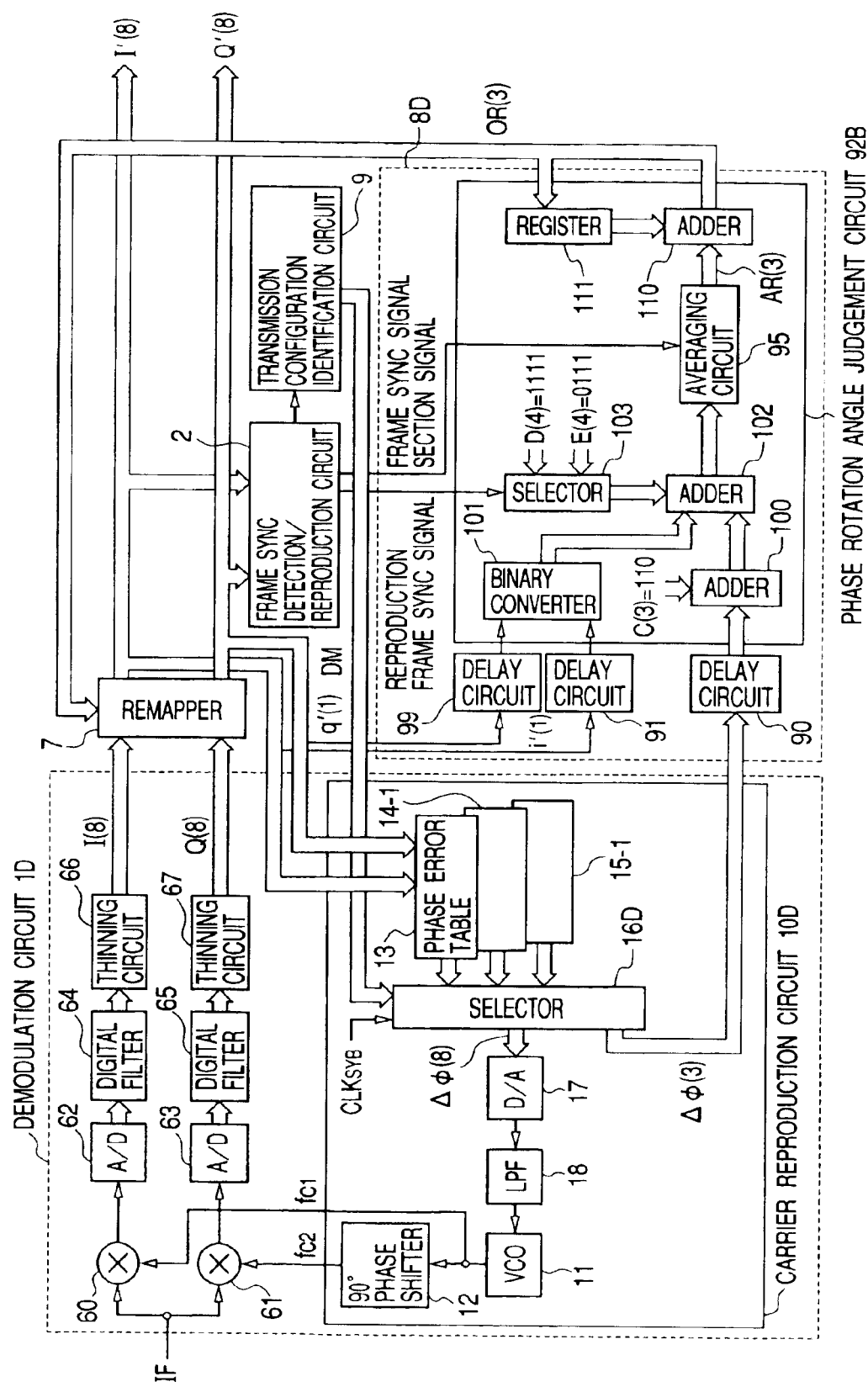
FIG. 5 is a block diagram showing the structure of the main portion of a PSK modulated wave receiver according to a second embodiment of the invention.

FIG. 5 is a block diagram showing the main portion of a broadcasting receiver (PSK modulated wave receiver) of this invention. In FIG. 5, like elements to those shown in FIG. 1 are represented by using identical reference numerals.

Figure 16:
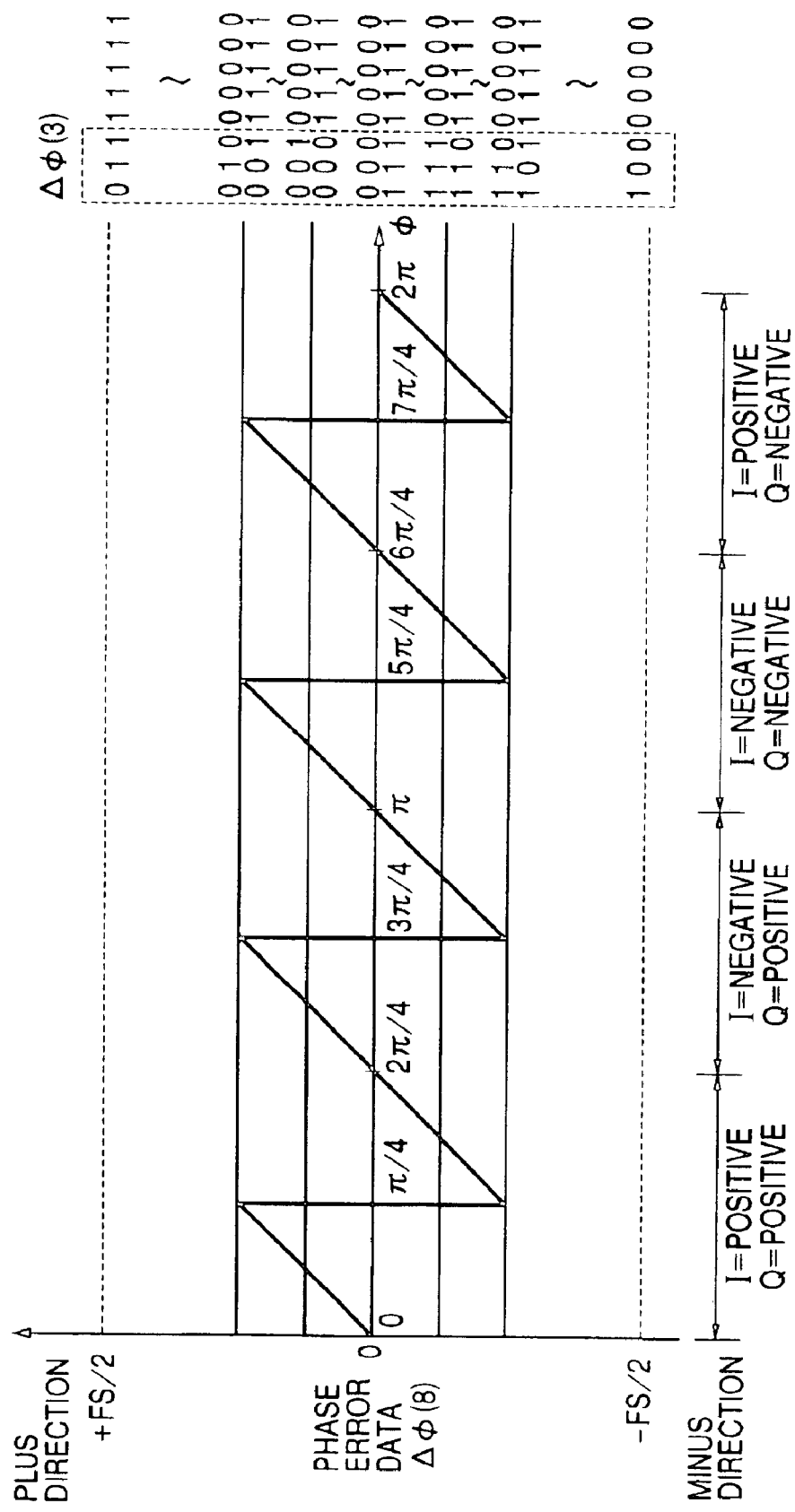
FIG. 16 is a diagram illustrating a phase error table for QPSK.
Figure 17:
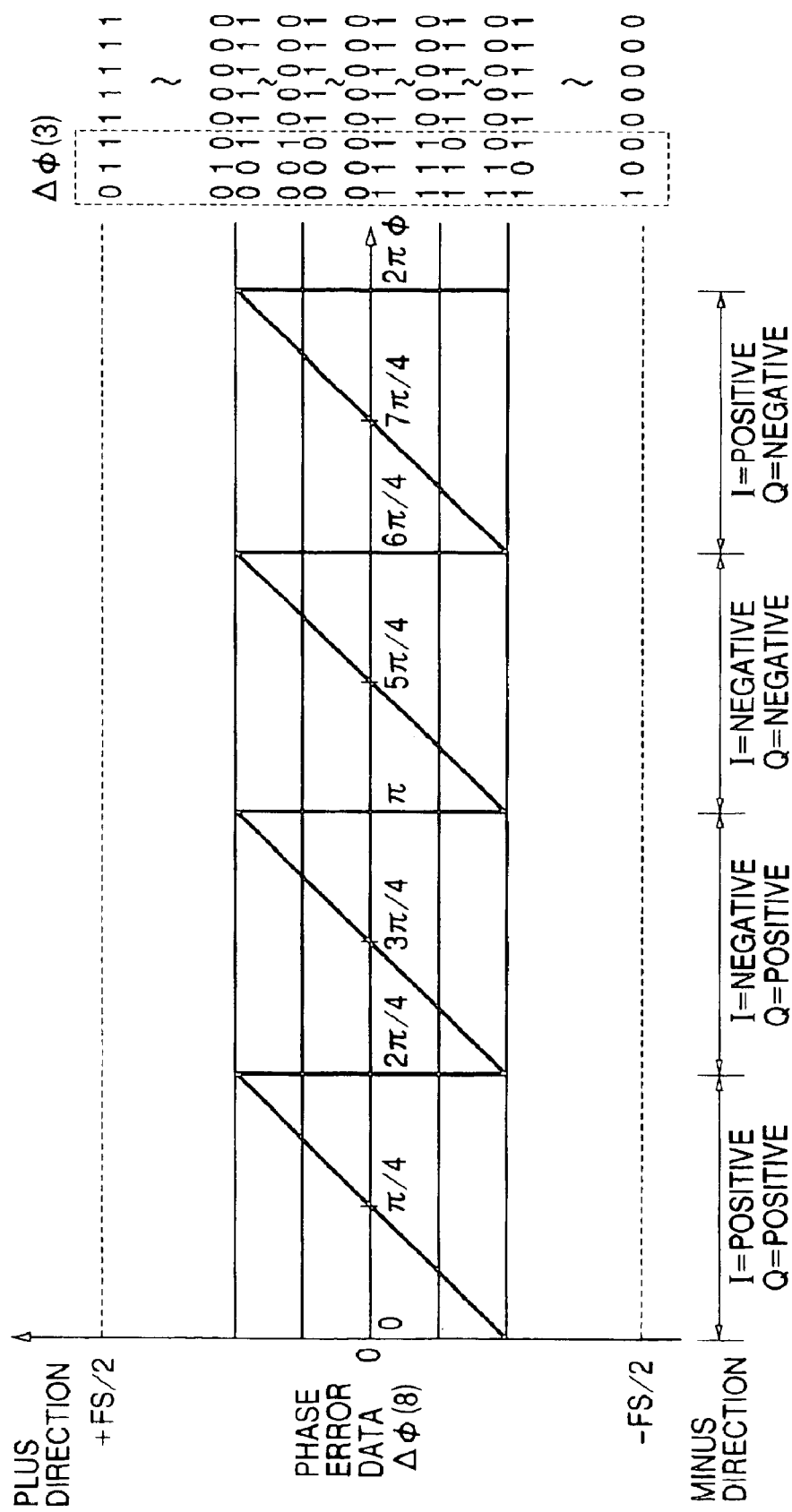
FIG. 17 is a diagram illustrating a phase error table for QPSK.

In the embodiment shown in FIG. 1, the phase error data ΔΦ(3) is read from the BPSK phase error table 15-1, whereas in the embodiment shown in FIG. 5, the phase error data ΔΦ(3) is read from the QPSK phase error table 14-1 (refer to FIG. 16).

After the reception start and until the transmission configuration identification circuit 9 identifies the multiplex configuration of the frame and a reception signal phase rotation angle detection circuit 8D detects the reception signal phase rotation angle, a selector 16D of a carrier reproduction circuit 10D enables only the 8PSK phase error table 13 during the period while the symbol clock CLKSYB takes the high level, reads the phase error data ΔΦ(8) corresponding to the I and Q symbol stream data I'(8) and Q'(8) output from the remapper 7 during the high level section of the symbol clock CLKSYB, and outputs it to the D/A converter 17. In parallel to the above operations, the selector 16D enables only the QPSK phase error table 14-1 during the period while the symbol clock CLKSYB takes the low level, reads the upper 3-bit phase error data ΔΦ(3) of the phase error data ΔΦ(8) corresponding to the I and Q symbol stream data I'(8) and Q'(8) output from the remapper 7 during the low level section of the symbol clock CLKSYB, from the phase error table 14-1. It can be judged from the phase error data ΔΦ(3) whether the absolute value of the phase error is larger or smaller than π/8.

After the transmission configuration identification circuit 9 identifies the multiplex configuration of the frame and a reception signal phase rotation angle detection circuit 8D detects the reception signal phase rotation angle (e), the selector 16D reads the phase error data ΔΦ(8) corresponding to the I and Q symbol stream data I'(8) and Q'(8) from the phase error table corresponding to the modulation method of the reception signal currently demodulated by a demodulation circuit 1D, during the period while the symbol clock CLKSYB takes the high level, and outputs it to the D/A converter 17. During the period while the symbol clock CLKSYB takes the low level, the selector 16D reads the phase error data ΔΦ(3) corresponding to the I and Q symbol stream data I'(8) and Q'(8) from the phase error table 14-1.

The delay circuit 90 delays the phase error data ΔΦ(3) read by the selector 16D by a predetermined delay time, and thereafter outputs it. When the frame sync detection/reproduction circuit 2 captures the frame sync signal from the I and Q symbol stream data I'(8) and Q'(8) and starts outputting the start portion of the reproduced frame sync signal, the delay circuit 90 outputs the phase error data ΔΦ(3) corresponding to the start portion of the frame sync signal, among the I symbol stream data I'(8). The delay circuit 91 delays the MSB code data i'(1) of the I symbol stream data I'(8) by a predetermined delay time, and thereafter outputs it. When the frame sync detection/reproduction circuit 2 captures the frame sync signal from the I and Q symbol stream data I'(8) and Q'(8) and starts outputting the start portion of the reproduced frame sync signal, the delay circuit 91 outputs the code bit data i'(1) corresponding to the start portion of the frame sync signal, among the I symbol stream data I'(8).

A delay circuit 99 delays the MSB code bit data q'(1) of the Q symbol stream data Q'(8) by a predetermined time, and thereafter outputs it. When the frame sync detection/reproduction circuit 2 captures the frame sync signal from the I and Q symbol stream data I'(8) and Q'(8) and starts outputting the start portion of the reproduced frame sync signal, the delay circuit 99 outputs the code bit data q'(1) corresponding to the start portion of the frame sync signal, among the Q symbol stream data I'(8).

A phase rotation angle judgement circuit 92B judges, from the portion of the outputs of the delay circuits 90 and 91 corresponding to the frame sync signal, the phase rotation angle relative to the transmission side of the symbols corresponding to the bit "1" of the frame sync signal among the I and Q symbol stream data I'(8) and Q'(8) output from the remapper 7, and also judges the phase rotation angle relative to the transmission side of the symbols corresponding to the bit "0" of the frame sync signal, the judgement results being sequentially output. In a phase rotation angle judgement circuit 92B, a 3-bit adder (no carry to the fourth bit) 100 adds the output of the delay circuit 90 to C(3)=(110), and outputs the lower 2 bits.

Figure 6:
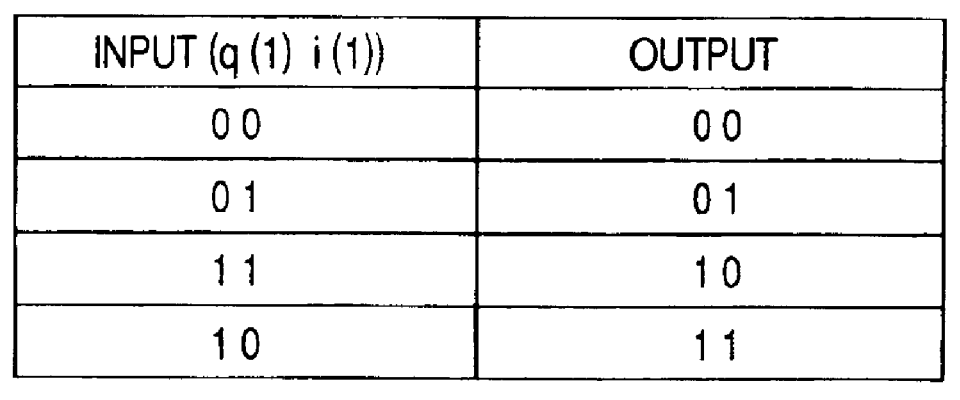

A binary converter 101 converts 2 bits with the upper bit output from the delay circuit 99 and the lower bit output from the delay circuit 91 into a binary code in accordance with the table shown in FIG. 6. A 4-bit adder (no carry to the fifth bit) 102 performs addition of four-bit data. One input side of the adder 102 is input with the output from the binary converter 101 at the upper 2 bits, and with the lower two-bit output of the adder 100 at the lower two bits. The other input side of the adder 102 is connected to a selector 103. The selector 103 is input with the bit stream of the reproduced frame sync signal output from the frame sync detection/reproduction circuit 2, and outputs D(4)=(1111) when the bit "0" is input, or E(4)=(0111) when the bit "1" is input. The adder 102 outputs the upper 3 bits of the addition result as the reception signal phase rotation angle signal R(3).

The averaging circuit 95 averages the reception signal phase rotation angle signal R(3). For example, the frame sync signals for four frames are averaged and the average is output as the reception signal phase rotation angle signal AR(3). The 3-bit adder 110 (no carry to the fourth bit) adds the previous reception signal phase rotation angle signal OR(3) loaded in the register 111 and the current reception signal phase rotation angle signal AR(3), and outputs the addition result to the remapper 7 and the like as a new reception signal phase angle rotation signal OR(3). The register 111 stores the reception signal phase rotation angle signal OR(3) output from the adder 110.

The other structure is quite the same as that shown in FIG. 1.

Next, the operation of this embodiment constructed as above will be described.

It is assumed that the register 111 is cleared to (000) in advance.

(1) Reception Start

When the reception starts, the remapper 7 outputs the I and Q symbol stream data I(8) and Q(8) input from the demodulation circuit 1D as the data I'(8) and Q'(8) without phase rotation.

After the reception start and until the transmission configuration identification circuit 9 identifies the multiplex configuration of the frame and the reception signal phase rotation angle detection circuit 8D detects the reception signal phase rotation angle, the selector 16D of the carrier reproduction circuit 10D enables only the 8PSK phase error table 13 during the period while the symbol clock CLK$_{SYB}$ takes the high level, reads the phase error data ΔΦ(8) corresponding to the I and Q symbol stream data I'(8) and Q'(8) output from the remapper 7 during the high level section of the symbol clock CLK$_{SYB}$, and outputs it to the D/A converter 17. In parallel to the above operations, the selector 16D enables only the QPSK phase error table 14-1 during the period while the symbol clock CLK$_{SYB}$ takes the low level, reads the upper 3-bit phase error data ΔΦ(3) of the phase error data ΔΦ(8) corresponding to the I and Q symbol stream data I'(8) and Q'(8) output from the remapper 7 during the low level section of the symbol clock CLK$_{SYB}$, from the phase error table 14-1, and outputs it to the delay circuit 90.

As the selector 16D reads the phase error data ΔΦ(8) from the 8PSK phase error table 13 and outputs it to the D/A converter 17, the demodulation circuit 1D therefore corrects the position of the digital signal in the signal point arrangement of "0" to "7" having the phase of 0, n/4, 2π/4, 3π/4, 4π/4, 5π/4, 6π/4, or 7π/4 on the transmission side by rotation of Θ=m×n/4 (m is an optional integer from 0 to 7) on the I-Q phase plane on the reception side.

In the phase error table 14-1, the upper three bits ΔΦ(3) of the phase error data ΔΦ(8) corresponding to the I and Q symbol stream data I'(8) and Q'(8) can judge whether the absolute value of the phase error is larger or smaller than n/8 (refer to FIG. 16). By combining ΔΦ(3) and the MSB code bit data i'(1) and q'(1) of the I and Q symbol stream data 1'(8) and Q'(8) and performing a simple arithmetic operation, it can be judged whether the received signal point as viewed from the output side of the remapper 7 corresponds to which one of the eight signal points "0" to "7". Since the signal point of the bit "0" or "1" of the frame sync signal on the transmission side is determined as "0" or "4", the reception signal phase rotation angle as viewed from the output side of the remapper 7 can be determined unanimously from the phase error data ΔΦ(3) and the code bit data i'(1) and q'(1) of the I and Q symbol stream data 1'(8) and Q'(8).

In the reception signal phase rotation angle detection circuit 8D, the delay circuits 90, 91 and 99 delay the phase error data ΔΦ(3) output from the selector 16C and the code bit data I'(1) and Q'(1) of the I and Q symbol stream data I'(8) and Q'(8) derived from the output of the remapper 7. When the frame sync detection/reproduction circuit 2 captures the frame sync signal from the I and Q symbol stream data I'(8) and Q'(8) and starts outputting the reproduced frame sync signal, the delay circuit 90 outputs the phase error data A(3) corresponding to the start portion of the frame sync signal, among the I symbol stream data I'(8), the delay circuit 91 outputs the code bit data i'(1) corresponding to the start portion of the frame sync signal, among the I symbol stream data I'(8), and the delay circuit 99 outputs the code bit data q'(1) corresponding to the start portion of the frame sync signal. The output timings of the delay circuits 90, 91, and 99 are adjusted in this manner. The outputs of the delay circuits 99 and 91 are converted into binary codes and input to the one input side of the adder 102 as its upper bit. The output of the delay circuit 90 is added to C(3)=(110) by the adder 100, and its upper 2 bits are input to the one input side of the adder 102 at its lower two bits.

Sometime after the reception start, the frame sync detection/reproduction circuit 2 captures the frame sync signal of the I and Q symbol streams I'(8) and Q'(8) and outputs the reproduced frame sync signal. Then, the selector 103 selects and outputs D(4)=(1111) for the bit "0" of the reproduced frame sync signal, and selects and outputs E(4)=(0111). The adder 102 adds one input and the other input at each bit position of the reproduced frame sync signal of 20 bits to output the upper 3 bits. The adder 102 classifies the reception signal phase rotation angle Θ into 0, π/4, 2π/4, 3π/4, 4π/4, 5π/4, 6π/4, and 7π/4 as shown in FIG. 2(A) which are related to the decimal notation R=0 to 7, to thereby output the reception signal phase rotation angle signal R(3) where R is expressed by the natural binary of 3 bits (refer to FIG. 2(2)).

The averaging circuit 95 fetches the output of the adder 102, while the frame sync signal section signal is input from the frame sync detection/reproduction circuit 2, averages for four frames similar to the case shown in FIG. 1, and outputs the result as the reception signal phase rotation angle signal AR(3). AR (3) is added by the adder 110 to the value stored in the register 111. Since the initial value is (000), the signal AR(3) itself is output to the remapper 7 as the reception signal phase rotation angle signal OR(3) relative to the transmission side as viewed at the output side of the demodulation circuit 1D, and loaded in the register 111. For example, if the reception signal phase rotation angle Θ represented by OR(3) is 2π/4, the remapper 7 performs the phase rotation by (−2π/4) for the absolute phasing. (010) is stored in the register 111.

(2) Ordinary Reception Operation

Immediately after the frame sync detection/reproduction circuit 2 captures the frame sync signal, the transmission configuration identification circuit 9 identifies the multiplex configuration and outputs the modulation method identification signal DM to the selector 16 and the like, the signal DM indicating the modulation method for the current I and Q symbol stream data I(8) and Q(8) output from the demodulation circuit 1D.

After the reception signal phase rotation angle signal OR(3) is output from the adder 110 and the absolute phasing is performed by the remapper 7, by using the demodulation method identification signal DM input from the transmission configuration identification circuit 9, for example, if the reception signal phase rotation angle Θ indicated by OR(3) is 2π/4, the selector 16D enables only the phase error table 13 during the period while the symbol clock CLKSYB takes the high level while the demodulation circuit 1D demodulates the signal portion of the 8PSK modulation method, reads the phase error data ΔΦ(8) corresponding to the I and Q symbol stream data I'(8) and Q''(8) output from the remapper 7 from the phase error table 13, and outputs it to the D/A converter 17. As a result, the phase of the reference carriers $f_{c1}$ and $f_{c2}$ is corrected in such a manner that the received signal point of the digital signal (abc) 8PSK mapped on the transmission side to the signal point arrangement "0", "1", "2", "3", "4", "5", "6", or "7" appears at the signal point arrangement "2", "3", "4", "5", "6", "17", "0", or "1" rotated by 8 as viewed at the input side of the remapper 7, when taking into consideration the phase rotation of η=−2π/4 of I'(8) and Q'(8) relative to I(8) and Q(8) irrespective of the phase change in the reception carriers.

In this case, the I and Q symbol stream data I(8) and Q(8) of the 8PSK modulation method portion output from the demodulation circuit 1D is rotated by η=Θ=−2π/4 by the remapper 7 for the absolute phasing. Therefore, the received signal point of the I and Q symbol stream data I'(8) and Q'(8) output from the remapper 7 is coincident with that on the transmission side.

The selector 16D enables only the phase error table 14-1 during the period while the symbol clock CLKSYB takes the high level while the demodulation circuit 1D demodulates the signal portion of the QPSK modulation method, reads the phase error data ΔΦ(8) corresponding to the I and Q symbol stream data I'(8) and Q'(8) from the phase error table 14-1, and outputs it to the D/A converter 17. As a result, the phase of the reference carriers $f_{c1}$ and $f_{c2}$ is corrected in such a manner that the received signal point of the digital signal (abc) QPSK mapped on the transmission side to the signal point arrangement "1", "3", "5", or "7" appears at the signal point arrangement "3", "5", "7", or "1" rotated by Θ as viewed at the input side of the remapper 7, when taking into consideration the phase rotation of η=−2π/4 of I'(8) and Q'(8) relative to I(8) and Q(8).

Therefore, the reception signal point of the I and Q symbol stream data I'(8) and Q'(8) output from the remapper 7 is coincident with that of the transmission side.

The selector 16D enables only the phase error table 15-1 during the period while the symbol clock CLKSYB takes the high level while the demodulation circuit 1D demodulates the signal portion of the BPSK modulation method, reads the phase error data ΔΦ(8) corresponding to the I and Q symbol stream data I'(8) and Q'(8) from the phase error table 15-1, and outputs it to the D/A converter 17. As a result, the phase of the reference carriers $f_{c1}$ and $f_{c2}$ is corrected in such a manner that the received signal point of the digital signal (f) BPSK mapped on the transmission side to the signal point arrangement "0" or "4" appears at the signal point arrangement "2" or "6", when taking into consideration the phase rotation of q=2π/4 of I'(8) and Q'(8) relative to I(8) and Q(8). Therefore, the phase rotation angle is retained which is the same as the reception signal phase rotation angle Θ of 8PSK. Since the I and Q symbol stream data I(8) and Q(8) of the QPSK modulation method portion output from the demodulation circuit 1D is rotated by the remapper 7 by η=−Θ=−2π/4, the received signal point of the I and Q symbol stream data I'(8) and Q'(8) output from the remapper 7 is coincident with that on the transmission side.

Also in the ordinary reception operation, the selector 16D enables only the phase error table 14-1 during the period while the symbol clock CLKSYB takes the low level, reads the phase error data ΔΦ(3) corresponding to the I and Q symbol stream data I'(8) and Q'(8) output from the remapper 7 during the low level section of the symbol clock CLKSYB, from the phase error table 14-1, and outputs it to the delay circuit 90. The phase rotation angle judgement circuit 92B judges the phase rotation angle from the outputs of the delay circuits 90, 91 and 99, and outputs the judgement result in the form of the reception signal phase rotation angle signal R(3). The averaging circuit 95 averages the signals for four frames and outputs the result as the reception signal phase angle signal AR(3).

When the phase rotation angle judgement circuit 92B and averaging circuit 95 of the reception signal phase rotation angle detection circuit 8D detect the second phase rotation angle and output the reception signal phase rotation angle signal AR(3), this reception signal phase rotation angle signal AR(3) indicates the phase rotation angle relative to the transmission side of I'(8) and Q'(8) after the absolute phasing by the remapper 7. As this signal is added to the previous reception signal phase rotation angle signal OR(3)

stored in the register 111, the reception signal phase rotation angle OR(3) relative to the transmission side as viewed at the input side of the remapper 7 can be obtained. This reception signal phase rotation angle OR(3) is output to the remapper 7 to perform the second phase rotation (phase rotation by −Θ where Θ is the reception signal phase rotation angle indicated by OR(3)), and stored in the register 111. Similar operations are repeated each time the phase rotation angle judgement circuit 92B and averaging circuit 95 of the reception signal phase rotation angle detection circuit 8D detect a new phase rotation angle.

In this embodiment, the I and Q symbol stream data I'(8) and Q'(8) after the absolute phasing by the remapper 7 is input to the phase error table of the carrier reproduction circuit 10D. Therefore, during the ordinary reception, irrespective of what value the reception signal phase rotation angle takes, the received signal point of the I and Q symbol stream data I'(8) and Q'(8) input to the phase error table is the same as the transmission side. Therefore, only one phase error table per each modulation method is provided in the carrier reproduction circuit 10D. It is possible to reduce the number of phase error tables in the carrier reproduction circuit 10D and the circuit scale can be simplified considerably.

Of the phase error data in the QPSK phase error table 14-1 for the I and Q symbol stream data corresponding to the bit "1" or "0" of the demodulated frame sync signal output from the remapper 7, the upper three bits for judging whether the absolute value of the phase error is larger or smaller than π/8 and the code bit data i'(1) and q'(1) of the I and Q symbol stream data I'(8) and Q'(8) are used for judging the phase rotation angle of the I and Q symbol stream data I(8) and Q(8) corresponding to the bit "1" or "0" of the frame sync signal as viewed at the output side of the demodulation circuit 1D. The reception signal phase rotation angle can be judged through simple calculation so that a large capacity ROM is not necessary for judging the phase rotation angle and the circuit scale can be made small.

In this embodiment, the phase rotation angle is judged for both the bit "1" and bit "0" of the frame sync signal portion of the I and Q symbol stream data I'(8) and Q'(8). The phase rotation angle may be judged for one of the bits "1" and "0". The averaging methods by the averaging circuit 5 can be modified in various ways. For example, averaging for only one frame or two frames may be executed, or one bit or a plurality bit at particular positions of the frame sync signal may be used for averaging for a plurality of frames.

Figure 7:
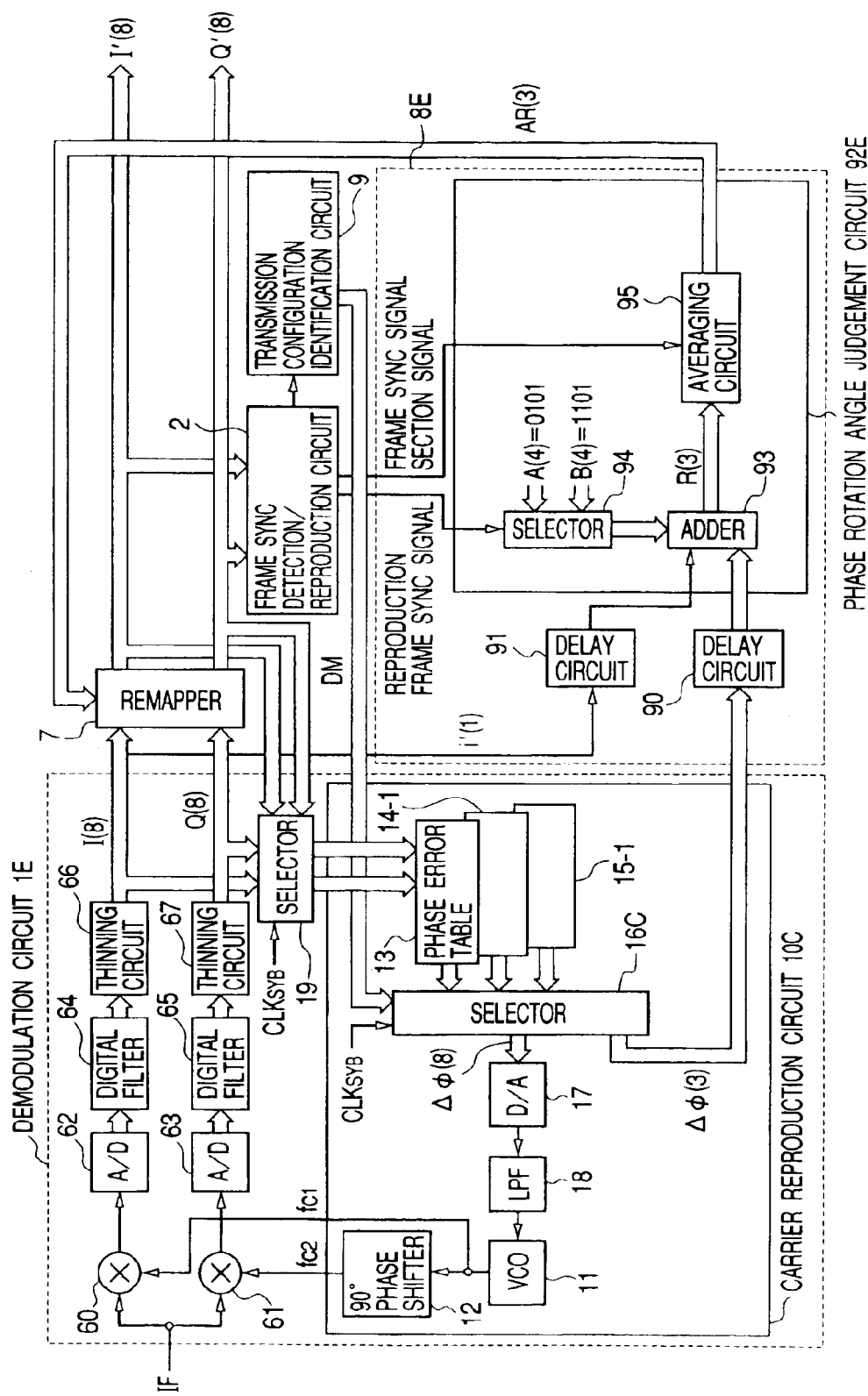
FIG. 7 is a block diagram showing the structure of the main portion of a PSK modulated wave receiver according to a modification of the first embodiment shown in FIG. 1.

The embodiment shown in FIG. 1 may be modified into an embodiment shown in FIG. 7. In FIG. 7, the reception signal phase rotation angle detection circuit 8C shown in FIG. 1 is replaced by a reception signal phase rotation angle detection circuit 8E, and the phase rotating angle judgement circuit 92 is replaced by a phase rotating angle judgement circuit 92E with the adder 110 and resister 111 being omitted. In a demodulation circuit 1E, a selector 19 is provided at the input side of the phase error tables 13, 14-1, and 15-1 to be input with the I and S symbol stream data I'(8) and Q'(8). During the high level section of the symbol clock CLKSYB, the I and Q symbol stream data I'(8) and Q'(8) output from the remapper 7 is input to each of the phase error tables 13, 14-1 and 15-1, whereas during the low level section of the symbol clock $CLK_{SYB}$, the I and Q symbol stream data I(8) and Q(8) output from the demodulation circuit 1E is input to each of the phase error tables 13, 14-1 and 15-1. The MSB code bit data i(1) of the I symbol stream data I(8) output from the demodulation circuit 1E is input to the delay circuit 91.

After the reception start and until the transmission configuration identification circuit 9 identifies the multiplex configuration of the frame and the reception signal phase rotation angle detection circuit 8E detects the reception signal phase rotation angle, a selector 16C enables only the 8PSK phase error table 13 during the period while the symbol clock CLKSYB takes the high level, reads the phase error data ΔΦ(8) corresponding to the I and Q symbol stream data I'(8) and Q'(8) supplied via the selector 19 from the remapper 7 during the high level section of the symbol clock CLKSYB from the phase error table 13, and outputs it to the D/A converter 17. In parallel to the above operations, the selector 16C enables only the BPSK phase error table 15-1 during the period while the symbol clock CLKSYB takes the low level, reads the upper 3-bit phase error data ΔΦ(3) of the phase error data ΔΦ(8) corresponding to the I and Q symbol stream data I(8) and Q(8) supplied via the selector 19 from the remapper 7 during the low level section of the symbol clock $CLK_{SYB}$, from the phase error table 15-1.

After the transmission configuration identification circuit 9 identifies the multiplex configuration of the frame and the reception signal phase rotation angle detection circuit 8E detects the reception signal phase rotation angle 0, the selector 16C enables the phase error table 13, 14-1 or 15-1 corresponding to the modulation method of the reception signal demodulated by the demodulation circuit 1E during the high level section of the symbol clock CLKSYB, reads the phase error data ΔΦ(8) corresponding to the I and Q symbol stream data I'(8) and Q'(8) supplied via the selector 19 from the remapper 7 during the high level section of the symbol clock CLKSYB, and outputs it to the D/A converter 17. During the period while the symbol clock CLKSYB takes the low level, the selector 16C enables only the BPSK phase error table 15-1 during the low level section of the symbol clock CLKSYB, and reads the upper 3-bit phase error data ΔΦ(3) of the phase error data ΔΦ(8) corresponding to the I and Q symbol stream data I(8) and Q(8) supplied via the selector 19 from the demodulation circuit 1E during the low level section of the symbol clock CLKSYB.

The delay circuits 90 and 91, adder 93, selector 94, and averaging circuit 95 respectively of the reception signal phase rotation angle detection circuit 8E execute the processes similar to those described with FIG. 1. The adder 93 and averaging circuit 95 can therefore output the reception signal phase rotation angle signals A(3) and AR(3) relative to the transmission side as viewed at the input side of the remapper 7. By omitting the adder 110 and register 111 shown in FIG. 1, AR(3) can be directly output to the remapper 7 and the like.

Figure 8:
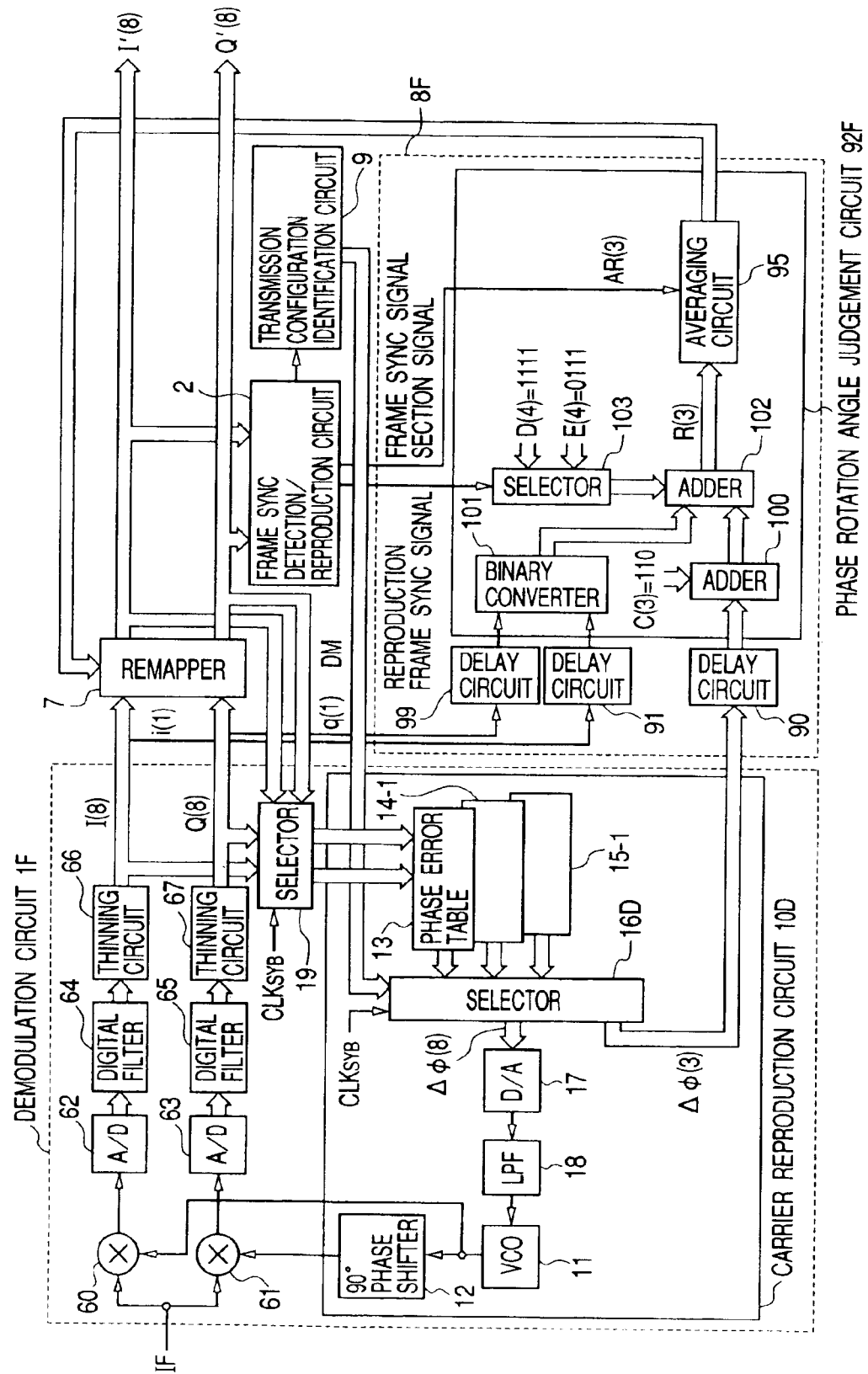
FIG. 8 is a block diagram showing the structure of the main portion of a PSK modulated wave receiver according to a modification of the second embodiment shown in FIG. 5.

The embodiment shown in FIG. 5 may be modified into an embodiment shown in FIG. 8. In FIG. 8, the reception signal phase rotation angle detection circuit 8D shown in FIG. 5 is replaced by a reception signal phase rotation angle detection circuit 8F, and the phase rotating angle judgement circuit 92B is replaced by a phase rotating angle judgement circuit 92F with the adder 110 and resister 111 being omitted. In a demodulation circuit 1F, a selector 19 is provided at the input side of the phase error tables 13, 14-1, and 15-1 to be input with the I and S symbol stream data I'(8) and Q'(8). During the high level section of the symbol clock CLKSYB, the I and Q symbol stream data I'(8) and Q'(8) output from the remapper 7 is input to each of the phase error tables 13, 14-1 and 15-1, whereas during the low level section of the symbol clock CLKSYB, the I and Q symbol stream data I(8) and Q(8) output from the demodulation circuit 1F is input to each of the phase error tables 13, 14-1 and 15-1. The MSB code bit data i(1) of the I symbol stream data I(8) output from the demodulation circuit 1F is input to the delay circuit 91. The code bit data q(1) of the Q symbol stream data Q(8) output from the demodulation circuit 1F is input to the delay circuit 99.

After the reception start and until the transmission configuration identification circuit 9 identifies the multiplex configuration of the frame and the reception signal phase rotation angle detection circuit 8F detects the reception signal phase rotation angle, a selector 16D enables only the 8PSK phase error table 13 during the period while the symbol clock CLKSYB takes the high level, reads the phase error data ΔΦ(8) corresponding to the I and Q symbol stream data I'(8) and Q'(8) supplied via the selector 19 from the remapper 7 during the high level section of the symbol clock CLKSYB from the phase error table 13, and outputs it to the D/A converter 17. In parallel to the above operations, the selector 16D enables only the QPSK phase error table 14-1 during the period while the symbol clock CLKSYB takes the low level, and reads the upper 3-bit phase error data ΔΦ(3) of the phase error data ΔΦ(8) corresponding to the I and Q symbol stream data I(8) and Q(8) supplied via the selector 19 from the remapper 7 during the low level section of the symbol clock CLKSYB, from the phase error table 14-1.

After the transmission configuration identification circuit 9 identifies the multiplex configuration of the frame and the reception signal phase rotation angle detection circuit 8F detects the reception signal phase rotation angle Θ, the selector 16D enables one of the phase error tables 13, 14-1 and 15-1 corresponding to the modulation method of the reception signal demodulated by the demodulation circuit 1F during the high level section of the symbol clock CLKSYB, reads the phase error data ΔΦ(8) corresponding to the I and Q symbol stream data I'(8) and Q'(8) supplied via the selector 19 from the remapper 7 during the high level section of the symbol clock CLKSYB and outputs it to the D/A converter 17. During the period while the symbol clock CLKSYB takes the low level, the selector 16D enables only the BPSK phase error table 14-1 during the low level section of the symbol clock CLKSYB, and reads the upper 3-bit phase error data ΔΦ(3) of the phase error data ΔΦ(8) corresponding to the I and Q symbol stream data I(8) and Q(8) supplied via the selector 19 from the demodulation circuit 1F during the low level section of the symbol clock CLKSYB. The delay circuits 90, 91 and 91, adders 100 and 102, binary converter 101, selector 103, and averaging circuit 95 execute the processes similar to those described 6, with FIG. 5. The adder 102 and averaging circuit 95 can therefore output the reception signal phase rotation angle signals A(3) and AR(3) relative to the transmission side as viewed at the input side of the remapper 7. By omitting the adder 110 and register 111 shown in FIG. 5, AR(3) can be directly output to the remapper 7 and the like.

In the above-described modifications of the embodiment, after the reception start and until the transmission configuration identification circuit identifies the transmission configuration and the reception signal phase rotation angle detection circuit detects the reception signal phase rotation angle, the selector of the carrier reproduction circuit outputs the phase error data read from the 8PSK phase error table to the D/A converter. Instead, a constant value indicating the phase error =zero may be output.

The averaging circuit shown in FIGS. 1, 5, 7 and 8 may be omitted.

The reception signal phase rotation angle detection circuit shown in FIGS. 1, 5, 7 and 9A and 9(B) may be replaced by the reception signal phase rotation angle detection circuit shown in FIG. 10.

The PSK modulated wave of digital signals modulated by three modulation methods 8PSK, QPSK and BPSK and multiplexed in time has been used. A PSK modulated wave of digital signals modulated only by QPSK and BPSK and multiplexed in time may also be received and demodulated (two phase error tables for QPSK and BPSK are used), a PSK modulated wave of digital signals modulated only by 8PSK and QPSK and multiplexed in time may also be received and demodulated (two phase error tables for 8PSK and QPSK are used), or a PSK modulated wave of digital signals modulated only by 8PSK and BPSK and multiplexed in time may also be received and demodulated (two phase error tables for 8PSK and BPSK are used).

Instead of the sync detection demodulation operation of the demodulation circuit, a quasi-sync detection modulation operation of the demodulation circuit may also be used.

INDUSTRIAL APPICABILITY

According to the invention, the phase error data corresponding to the I and Q symbol stream data after the absolute phasing by an inverse phase rotation means is read from the phase error table of a carrier reproduction means. Accordingly, irrespective of what value the reception signal phase rotation angle takes, the received signal point of the I and Q symbol stream data input to the phase error table becomes coincident with that on the transmission side. A single phase error table of a carrier reproduction means can be provided for each modulation method. The number of phase error tables in the carrier reproduction means can be reduced and the circuit scale can be simplified considerably.

What is claimed is:

1. A receiver comprising: a demodulation means for demodulating a PSK modulated signal of digital signals modulated by a plurality of different PSK modulation methods (e.g. BPSK. QPSK. 8PSK) having different numbers of phases and multiplexed in time, by using carriers ($f_{c1}$ and $f_{c2}$) reproduced by carrier reproduction means, and outputting I and Q symbol stream data (I(8), Q(8)); a reception signal phase rotation angle detection means for detecting a phase rotation angle relative to a transmission side of the I and Q symbol stream data output from said demodulation means; and an inverse phase rotation means (7) for inversely rotating a phase of the I and Q symbol stream data output from said demodulation means by a phase rotation angle (OR(3)) detected by said reception signal phase rotation angle detection means, thereby performing absolute phasing, wherein the carrier reproduction means of said reproduction means has phase error tables (13, 14-1, 15-1) for respective ones of the plurality of PSK modulation methods, the tables storing carrier phase error data for various demodulated I and Q symbol stream data pairs, and while said demodulation means demodulates a reception signal corresponding to a specific one of the PSK modulation methods, phase error data (ΔΦ(8)) corresponding to the demodulated I and Q symbol stream data is read from the phase error table corresponding to the specific modulation method to correct the phase of the carriers, the receiver being characterized in that:

while said demodulation means (1C, 1D) demodulates the reception signal corresponding to the specific one of the PSK modulation methods, the carrier reproduction means (10C, 10D) reads the phase error data corresponding to demodulated I and Q symbol stream data (I'(8), Q'(8)) after absolute phasing output from said inverse phase rotation means (7) from the phase error table corresponding to the specific modulation method to correct the phase of the carriers using the read phase error data.

2. A receiver comprising: a demodulation means for demodulating a PSK modulated signal of digital signals modulated by a plurality of different PSK modulation methods (e.g., BPSK, QPSK, 8PSK) having different numbers of phases and multiplexed in time, by using carriers ($f_{c1}$ and $f_{c2}$) reproduced by carrier reproduction means, and outputting I and Q symbol stream data (I(8), Q(8)); a reception signal phase rotation angle detection means for detecting a phase rotation angle relative to a transmission side of the I and Q symbol stream data output from said demodulation means; and an inverse phase rotation means (7) for inversely rotating a phase of the I and Q symbol stream data output from said demodulation means by a phase rotation angle (OR(3)) detected by said reception signal phase rotation angle detection means, thereby performing absolute phasing, wherein the carrier reproduction means of said reproduction means has phase error tables (13, 14-1, 15-1) for respective ones of the plurality of PSK modulation methods, the tables storing carrier phase error data for various demodulated I and Q symbol stream data pairs, and while said demodulation means demodulates a reception signal corresponding to a specific one of the PSK modulation methods, phase error data ($\Delta\Phi(\mathbf{8})$) corresponding to the demodulated I and Q symbol stream data is read from the phase error table corresponding to the specific modulation method to correct the phase of the carriers, the receiver being characterized in that:

while said demodulation means (1E, 1F) demodulates the reception signal corresponding to the specific one of the PSK modulation methods, the carrier reproduction means (10C, 10D) reads the phase error data corresponding to demodulated I and Q symbol stream data (I'(8), Q'(8)) after absolute phasing output from said inverse phase rotation means (7) and the phase error data corresponding to a selected one of either the I or Q symbol stream data (I(8) or (Q(8)) output from said demodulation means, from the phase error table corresponding to the specific modulation method to correct the phase of the carriers using the read phase error data.

* * * * *